United States Patent [19]
Cunnagin et al.

[11] Patent Number: 5,923,820
[45] Date of Patent: Jul. 13, 1999

[54] METHOD AND APPARATUS FOR COMPACTING SWATH DATA FOR PRINTERS

[75] Inventors: Stephen Kelly Cunnagin; Thomas Jon Eade, both of Lexington, Ky.

[73] Assignee: Lexmark International, Inc., Lexington, Ky.

[21] Appl. No.: 08/788,062

[22] Filed: Jan. 23, 1997

[51] Int. Cl.⁶ .............................. G06F 15/00; H04N 1/41; G06K 9/36
[52] U.S. Cl. .......................... 395/108; 395/109; 358/426; 382/232; 382/235
[58] Field of Search .................... 395/101, 108, 395/110, 115, 109; 347/12, 16, 41; 358/426, 261.2; 382/232, 235

[56] References Cited

U.S. PATENT DOCUMENTS

| | | | |
|---|---|---|---|
| 3,694,813 | 9/1972 | Loh et al. | 340/172.5 |
| 3,827,357 | 8/1974 | Mahoney | 101/93 C |
| 3,873,761 | 3/1975 | Bigelow et al. | 178/6 |
| 4,481,602 | 11/1984 | Bohrer et al. | 364/900 |
| 4,558,461 | 12/1985 | Schlang | 382/236 |
| 4,651,199 | 3/1987 | Alkofer | 358/80 |
| 4,901,248 | 2/1990 | Ueno et al. | 364/519 |
| 5,107,338 | 4/1992 | Saito | 358/296 |
| 5,237,645 | 8/1993 | Nagata et al. | 395/115 |
| 5,272,768 | 12/1993 | Bauman et al. | 395/110 |
| 5,485,178 | 1/1996 | Tateyama et al. | 347/5 |
| 5,496,118 | 3/1996 | Ueno et al. | 400/61 |
| 5,522,016 | 5/1996 | Okada et al. | 395/108 |
| 5,596,423 | 1/1997 | Pritchard | 358/433 |
| 5,805,174 | 9/1998 | Ramchandran | 395/101 |

*Primary Examiner*—Edward L. Coles
*Assistant Examiner*—Mark Wallerson
*Attorney, Agent, or Firm*—John J. McArdle

[57] ABSTRACT

A printing system and method is provided that compacts bitmap print data by determining, per each swath of a page to be printed, the beginning and ending points of each "area" containing pels that will actually be printed within the swath, the locations of the starting and ending slices of each of these areas, and determining "voids" containing a sufficient minimum number of consecutive blank slices within the swath. A void is identified when a number of consecutive blank slices exceeds a predetermined threshold value. The printhead of the printing system will be turned off at the beginning of the void, and then turned back on as it approaches the end of the void, which would correspond to the beginning of the next area to be printed.

25 Claims, 8 Drawing Sheets

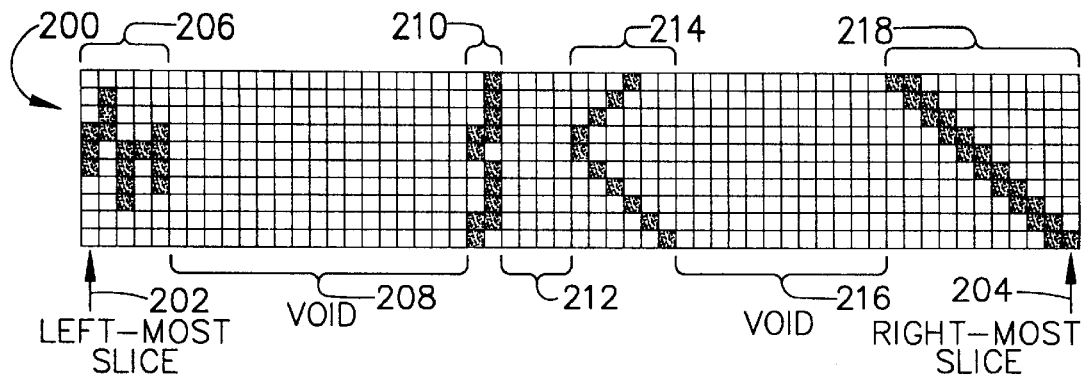
FIG. 5A ORIGINAL BITMAP DATA
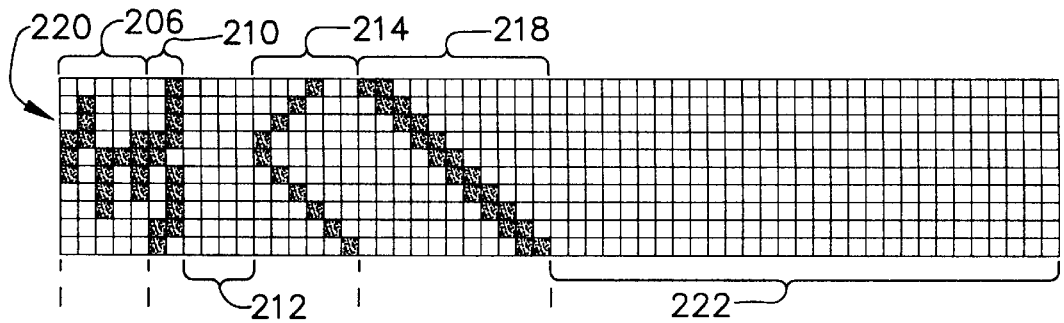
FIG. 5B COMPACTED BITMAP DATA
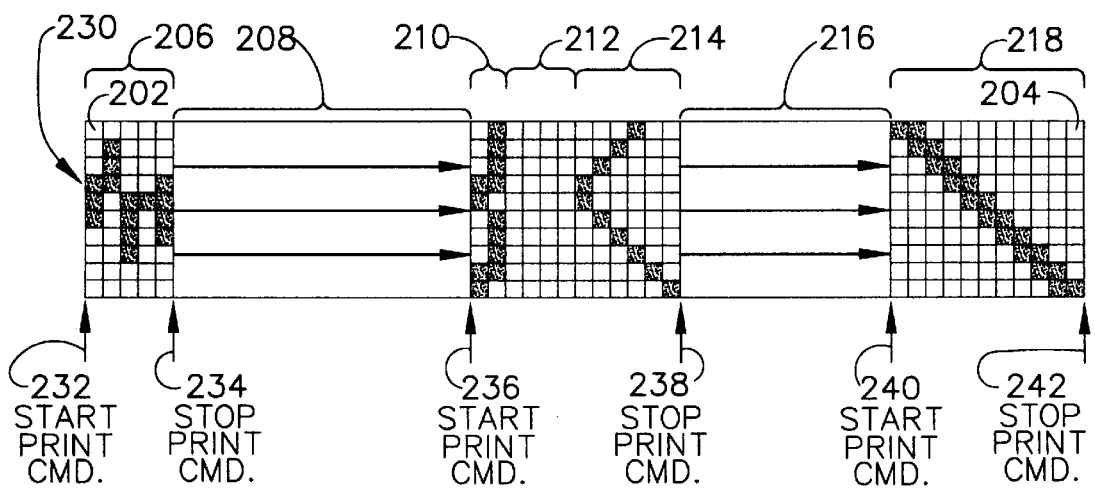
FIG. 5C PRINT DATA AND COMMANDS SENT TO PRINT ENGINE (IGNORING PADDING)

FIG. 6

METHOD AND APPARATUS FOR COMPACTING SWATH DATA FOR PRINTERS

TECHNICAL FIELD

The present invention relates generally to printing equipment and is particularly directed to ink jet printers of the type which use a printhead having an array of ink-spraying nozzles. The invention is specifically disclosed as an ink jet printer that prints swaths of print data and which compacts the original bitmap print data by eliminating voids of consecutive blank slices between areas of print data along the same swath, then later prints each area of each swath according to the original print data while causing the printhead carrier to pass over the voids without having to load zeros for such voids into the print image buffer.

BACKGROUND OF THE INVENTION

Ink jet printers using an array of multiple nozzles have been available for years, as have other types of printers using an array of multiple printing devices such as light emitting diodes (LEDs). In such printers, these nozzles are typically grouped together on a printhead, which typically is affixed to a moveable carriage or carrier that moves left and right in a horizontal manner with respect to a sheet of paper that is moving or indexing in a perpendicular, vertical direction. The multiple nozzles (or LEDs) are typically grouped in a vertical column (or multiple such vertical columns) so that, on one horizontal pass of the printhead via its carrier, multiple horizontal "columns" of dots or pels (i.e., print elements), can be simultaneously laid down in a "swath" of ink upon the paper or other print media.

As the printhead travels in the horizontal direction, it produces tiny dots along the swath according to "print data" that has been received by the printer, typically from a host computer. The "width" (i.e., "height," in this orientation) of the swath is dependent upon the resolution of the printhead nozzles (such as 300 dpi (dots per inch)), which is 1/300 inch resolution, as well as the number of nozzles in the vertical column array on the printhead. If, for example, the printhead has an array of 104 nozzles, and its resolution is 300 dpi, then the swath would be approximately 1/3 inch in width. Typical conventional printers format the print data so that each of the nozzles receives a digital (i.e., either "on" or "off") datum bit of information virtually simultaneously, which means that, in the above example, a data set of at least 104 bits must be sent to the printhead to control the 104 nozzles that are ready to either print a dot by turning ON (e.g., Logic 1), or to not print a dot which would be the nozzle's OFF state (e.g., Logic 0). This data set for a particular instant of time to control the entire vertical column array of 104 nozzles is designated by the term "slice." Therefore, to create a swath of print data, slice after slice of print data must be sent to the printhead to sequentially turn ON or OFF each of the printhead's nozzles at the correct times to reproduce the print data pattern representation that was earlier received by the printer from its host computer. In the above example, each slice must contain 104 bits of print data and, assuming that the horizontal resolution was also 300 dpi, there would then have to be 300 slices of data per horizontal inch of printhead travel via its carrier, thereby creating a rectangle of 104×300 pels, or 1/3 inch×1 inch.

In conventional ink jet printers, it is typical to import print data from a host PC and to store that print data by receiving "words" or "bytes" of print data, where each bit of the word or byte represents a single pel once the data is in the form of a "bitmap." Bitmap information typically arrives as a series of words of sixteen (16) bits each until a complete slice has been defined. Once the first slice of a swath has been received and stored in the printer's memory system, additional words are then received to define the next consecutive slice, and this procedure continues until all of the slices for a swath have been received and then stored in the printer's memory system. After the first swath has been completed, the subsequently received print data will again be in groupings of words to define the first slice of the next swath, which typically is the adjacent swath to the one that has just been completed.

This process continues until all of the slices for all of the swaths have been received for an entire page to be printed. If no data compression or data compacting techniques are used, the bitmap received by the printer and subsequently stored in the printer's memory system will represent a series of vertical slices adjacent to one another to make up a swath, and a series of horizontal swaths that are adjacent to one another to define the entire vertical structure of the page to be printed. All of these slices and swaths are composed of individual pels, whether or not these pels are to be printed or to be blank, thereby forming an entire rectangular page of bitmap print data. This approach is very memory intensive, because all of the "blank" areas where there are no pels to be printed nevertheless require the same amount of memory space as areas that have various pels being printed by the printhead. Without any type of data compression or data compacting techniques, the amount of memory area required to store a single page of print data will always be the number of pels required to make up all of the slices of each swath times the number of swaths for that page. For example, if an entire 8½×11 inch page of print data were to be stored in memory, at 300 dpi there would be (8.5×300)×(11×300)=8, 415,000 pels required. This roughly eight million bits of data would correspond to just over one million bytes of memory space required in the printer's memory system, and that is assuming no extra bits are used for any (typical) error checking routines. It is easy to see that there are advantages to reducing the amount of memory space required to hold print data in such printing systems.

In a patent by Bauman (U.S. Pat. No. 5,272,768), a data compression technique is disclosed that compresses character font data, then stores that compressed font character, and later decompresses the font character just before it is printed by a printhead. This Bauman data compression technique is typically used by an ink jet printer or perhaps by a printer using an array of LEDs, in which the rows to be printed are grouped in horizontal swaths. In one example provided in Bauman, each character comprises three (3) swaths of data, designated as "strips." Each of these strips is comprised of 16 bits or pels of print data, and each character font is analyzed to see if it requires all three (3) strips to be defined as containing at least one pel of "black" or printed data. If so, then that particular character's font is not compressed. On the other hand, if one or more of these strips is entirely blank for a particular character font, then that character is compressed by deleting the one or more strips that are not required to print that character. The printer's font ROM (i.e., read only memory) stores these character fonts in their compressed state, thereby saving some memory space within the font ROM.

As disclosed in Bauman, the print job data is received from a host computer and temporarily stored in an input buffer. This data would typically be ASCII data at this point, and not bitmap data. In these situations, the ASCII data must be interpreted or "RIPed" (i.e., undergo raster image processing), so that each character will have a bitmap created for it by the font ROM. Somewhere within the printer, the character must become a bitmap image before being sent to the print engine. In Bauman, as the ASCII characters arrive at the printer, for each font that is available in the printer's font ROM, such ASCII characters will be converted into a bitmap by use of the compressed image stored in the font ROM, which then must be uncompressed by the printer before being sent to the print engine. This is achieved by keeping track as to which of the three strips for each particular character font has been deleted to create the compressed font for that ASCII character. A data table is used to store this information, and when the bitmap is created for that particular character font, the "deleted" strip is then added to the bitmap of the entire character before being sent to the print engine. The Bauman invention works only with pre-determined character data, such as alphanumeric characters of different type font and point size, and which is imported into the printer as ASCII data or some other high level language data format.

Another U.S. patent, by Nagata (U.S. Pat. No. 5,237,645), discloses a printer that uses a light-emitting diode (LED) array, or a laser head or other similar device. Typical conventional laser printers do not print data in swaths, but instead by individual rows of single pels. If an array of LEDs is used, then the printing process can be done in swaths. In either case, Nagata teaches a method for compressing bitmap data before such data is stored in image memory. The print data is either received as already bitmapped data, or it arrives from a host computer in some type of high level page description language, such as PostScript™. If the data arrives in a high level language, then a bitmap must first be created by RIPing the data. Once the data is in a bitmap format, Nagata receives an entire page of data in an uncompressed state into a virtual page of memory. At this point, the entire page of data is divided into "virtual blocks," and this essentially is done by choosing a block size. Once the virtual block size has been chosen, the Nagata system must RIP enough "rasters" (i.e., lines that are one (1) pixel or pel in height) until there are enough to fill the entire height of a block (which now consists of a partial bitmap). Once these blocks have been determined, the Nagata printer analyzes each of the virtual blocks to decide whether or not any of the blocks are completely blank (i.e., containing no data to be printed within that particular area). Such blank blocks are designated as "empty" blocks. All non-empty blocks are then designated as "effective" blocks. Only effective blocks are stored in the image memory, although the location for each empty block is stored in a different set of memory registers. In this manner, a large amount of image memory can potentially be saved for each page of data to be printed.

By compressing the data according to the Nagata invention, more than one page of print data typically can fit within the limited space available in the image memory. Of course, this compressed data must later be uncompressed before being sent to the print engine. According to Nagata, the effective blocks are retrieved from image memory as needed in full bitmap format, per each raster section as required. When the printer arrives at an empty block, such raster sections are merely loaded with zeros to provide print data for the block, and then that data is transferred to the print engine. In this manner, the print engine always receives full bitmap data for the entire page to be printed. Accordingly, the print engine must physically pass over every physical pel location of the page to be printed, regardless of whether or not a pel is to be printed at that location. It will take the print engine just as long to "print" a large area of blank data as it would for that print engine to lay down black pels in various places upon an equivalent area of the page.

In U.S. Pat. No. 3,827,357 (by Mahoney), a printer is disclosed which stores an entire character at each line/column position. If the character is a blank or is an unprintable character (e.g., for some type of invalid code), then that character will not be printed. As each line of data is stored, a counter is decremented for each byte (i.e., character) that can be printed. During printing, the counter is again decremented for each character until it has been determined that all printable characters for this line have been printed. At that point, the rest of the line is abandoned, and the printer shifts its printhead immediately to the next line. Mahoney is an older patent that was primarily directed toward dot matrix or formed character printers. Mahoney essentially discloses one method for determining the right-most character of each line, and when that character has been reached by the printhead, then a line feed can immediately be commanded to occur.

Another example of a conventional ink jet printer is disclosed in Bohrer (U.S. Pat. No. 4,481,602). Bohrer essentially discloses a method for compressing font data before being stored in memory, then later decompresses that data before printing. Bohrer professes to use a method that minimizes the size of the pointer table to provide an overall three-times storage compression. As related above, any appreciable storage compression is valuable, because one can store more than a single page of print data into an image buffer that may have been designed to hold only one (uncompressed) page of print data in bitmap form, thereby increasing printing overall speed by more efficiently processing the print data. Of course, the Bohrer printer must perform a large amount of data manipulation to achieve its stated goal. According to the Bohrer method, each character is matched with its particular font, and a pointer and correction factor offset is created for each of these characters. This information is stored in a "scroll array" of compressed data and also in a "pointer table." When it is time to uncompress the data, the size of the character must be found in the scroll array, the position of the character in its "fall character box" must be determined, and the character is then copied into the bitmap, utilizing all of the stored data including the pointer and the correction factor offset. While Bohrer may save memory space in the image table, it also requires a large amount of processing that may slow down the overall printing procedure.

While data compression techniques have desirable features, it would also be desirable to "compact" print data in a manner that will not later require a decompression operation. While compacting this data, certain blank areas could be removed from the image memory table so that a significant amount of memory space is saved. By eliminating the requirement for first compressing and then later decompressing the data, processing time within the printer will be improved. Furthermore, such a procedure could be used on graphical data, not merely pre-determined character (i.e., font) data.

SUMMARY OF THE INVENTION

Accordingly, it is primary object of the present invention to provide a printing system that saves image memory space in a printer by compacting the bitmap print data so that a document's or a page's total bitmap size will be significantly reduced, thereby requiring less memory capacity to store each individual page.

It is another object of the present invention to provide a printing system that allows the print engine of the printer to be controlled in a manner so that it only prints certain areas that contain bitmap data to be printed, then skips over voids of consecutive blank slices for a particular swath as part of the page being printed.

It is a further object of the present invention to provide a method for compacting bitmap print data by analyzing the individual slices of each swath to be printed to determine areas that contain pels to actually be printed and voids containing sufficient consecutive blank slices so that the printer's printhead can be turned off while passing over the voids, then storing the compacted bitmap print data along with other variables or pointers that keep track of the beginning and ending slice locations for each of the areas of the swath.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved printing system is provided that compacts bitmap print data by determining, per each swath of a page to be printed, the beginning and ending points of each "area" containing pels that will actually be printed within the swath, the locations of the starting and ending slices of each of these areas, and determining "voids" containing a sufficient minimum number of consecutive blank slices within the swath. For each swath of print data, the left-most slice and the right-most slice of the current swath are found. Starting, at the left-most slice, for example, each subsequent slice is analyzed to determine whether or not any pels to be printed are contained in that slice. If a "blank" slice is found (i.e., a slice containing words that each contain all Logic 0 bit values), then the method continues to look for further consecutive blank slices to determine if a sufficient number of such consecutive blank slices exists to qualify as a "void." This typically is done by selecting a threshold value (e.g., 100 consecutive blank slices) that, if exceeded, will be considered as a large enough space of blank slices where it would be desirable to turn off the printhead at the beginning of the void, then turn the printhead back on as it approaches the end of the void, which would correspond to the beginning of the next area to be printed.

The compacted bitmap print data can be stored as a data file in memory, and this file will take up much less memory space than a non-compacted bitmap print data file by temporarily deleting the void information from the data file and placing the outermost slices of adjacent areas next to one another within the memory system of the printer or of a host computer, if the data compacting method occurs within the host computer. Of course, the voids must be accounted for, and this is accomplished by creating "pointer" variables that correspond to the beginning and end slices of each area to be printed for each swath. This compacted data is ultimately sent to the print engine of the printer in a manner such that, for each area to physically be printed on the print media (e.g., paper), the bitmap print data for these slices is sequentially forwarded to the print engine so that the nozzles (e.g., in the case of an ink jet printer) will receive their required digital ON-OFF data to properly instruct the nozzles as to when to emit a drop of ink on the print media.

As the printhead traverses each area by means of the print carrier drive, the printhead will ultimately come to the end of the area, at which time the printhead will be turned off or "disabled" as it begins to pass over the void between this area that was just printed and the next area to be printed on the far side of the void within this swath. The printhead stays disabled until it reaches the first slice to be printed of the next area containing pels to actually be printed on the print media. At this time, the printhead is again "enabled" or turned on, and receives bitmap print data as it emits ink (for the ink jet printer scenario) onto the print media. The number of areas and adjacent voids within a single swath is limited only by the number of slices between the left-most slice and the right-most slice of the entire swath, the threshold value that determines the minimum number of consecutive blank slices that qualifies as a void, the traversing velocity of the printhead as it is driven by the carrier drive, and the printhead's On-response time and Off-response time, including similar response times for the firing logic of the ASIC or other processing devices that control the printhead.

The advantages of the present invention are even greater if the printhead has the capability of moving at a higher speed when passing over voids that do not need to be printed at all. In this case it is likely that the threshold value would be increased for such high-speed movements by the printhead carrier.

The compacting process for the bitmap print data can take place either in a host computer or within the printer itself. If the compacting procedure occurs at a host computer, then the overall memory capacity of the printer can be better utilized by having the capability of storing more than one page of information (in many cases) within a memory space that would otherwise only be able to contain an single page of print data. The amount of data being transferred from the host computer to the printer would likely be greater when transferring the compacted bitmap print data as compared to transferring a high level language data file; however, in the case of ink jet printers, there may be no loss of throughput since the physical amount of time for a printhead to is traverse each swath to be printed on a given page may be at least as long as the amount of time required to download the compacted data for each of these swaths from the host computer to the printer.

The print data compacting method of the present invention initially analyzes, for each swath, the maximum possible number of areas for a particular swath size (which is variable depending upon the width of the print data for that swath), and this is primarily determined by the value of the threshold which represents the minimum number of consecutive blank slices that qualifies as a void. Once this has been determined, then the first area of data to be printed is analyzed by determining at what point enough consecutive blank slices are encountered that equal or exceed that threshold value. Once this has been found, the end of the first area is designated as being that slice which contains at least one pel that will actually be printed just before reaching the next void. When this occurs, two variable are created that represent the starting slice location of this area and the length (in slices) of that area. These two variables will ultimately be passed to the print engine at the same time that the actual bitmap data is being presented to the printhead for printing.

The first slice to be printed will not be transferred to the printhead until the horizontal location of the printhead coincides with the starting slice location for that area. After that occurs, the printhead will then begin to print according to the bitmap print data for that area, and when the number of slices for that area have all been accounted for, then printhead will be turned off or disabled. Depending on the printer, the printhead can traverse the void at the same speed as its normal printing speed or it can increase speed within the void until approaching the next area. When approaching the next area, an identical operation occurs as when printing the first area, such that the printhead receives data for the first slice of this next area as the printhead reaches the physical location of that first slice. After the printhead is enabled again, it prints the pels as specified by the bitmap print data for this area until it reaches the last slice for this area, then is again disabled. This turning on and off of the printhead continues as it passes over each of the areas of the swath until the printhead arrives at the right-most slice of the swath, at which time the printhead will index to the next swath (i.e., this typically occurs by use of the paper drive motor).

The main effect of the present invention is that a smaller bitmap print data file can define the entire bitmap for a particular page to be printed and, after being compacted, this data does not actually undergo any type of "de-compacting" operation, because the actual print data for the bitmaps of each area has not been transformed in any manner. The only changes to the overall information required to print the compacted data file is that certain pointer variables also must be stored to keep track of the starting and ending locations of each the areas of each of the swaths. This is quite unlike many conventional systems that first "compress" data to save memory space in, e.g., a print image table or in a font ROM. This compressed data must later be uncompressed, which is an extra operation that must be performed within the printer, thereby reducing the possible throughput of that printer.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIGS. 5A, 5B, and 5C represent various stages of bitmap print data as that data is manipulated by the compacting method of the present invention, showing first the original bitmap data, the compacted corresponding bitmap data, and the final bitmap showing the print data and commands sent to the print engine.

FIG. 6 is a front view of an example page to be printed showing the various areas that can be compacted according to the principles of the present invention.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
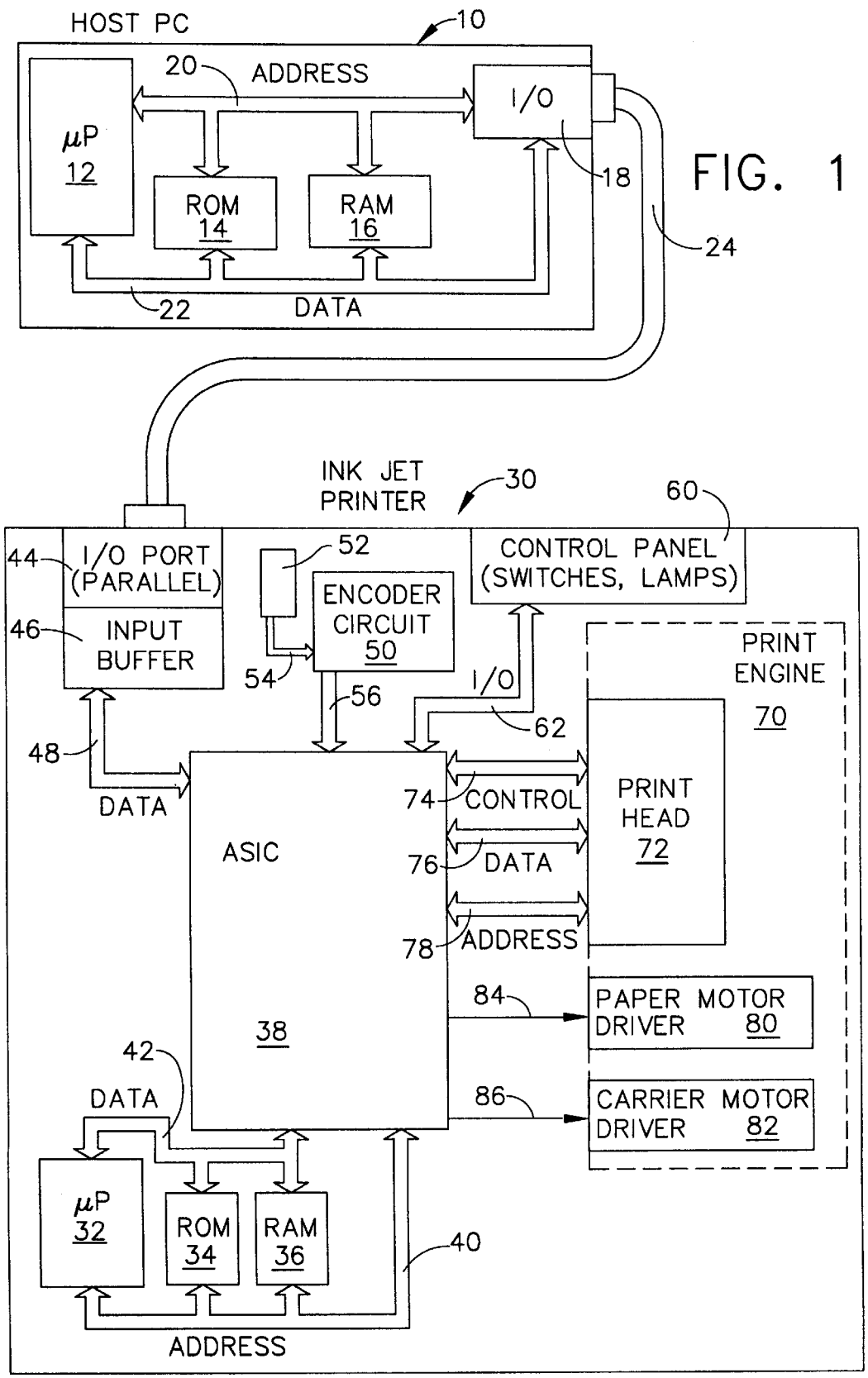
FIG. 1 is a block diagram of a printing system that contains a host computer and an ink jet printer that are configured for use according to the principles of the bitmap print data compacting method of the present invention.

Referring now to the drawings, FIG. 1 shows a printing system that includes a host computer or host PC 10 being connected to an ink jet printer 30 via a communications cable 24. Host computer 10 will typically contain a microprocessor 12, read only memory (ROM) 14, random access memory (RAM) 16, and some type of input/output port 18. These various essential structural elements are connected together by an address bus 20 and a data bus 22. In many applications, the host computer will contain some type of word processing program that creates data files to be printed, and these data files can be transferred to printer 30 in either a high level language (HLL) format such as a PostScript format or a different high level language such as PCL, or the data can be transferred in a "bitmap" format which can be directly operated upon by the printer 30. Alternatively, the host computer 10 could be a network server that contains a large non-volatile data storage device such as a hard disk drive (not shown) which can accept data files from other computers in a network system (such as a local area network (LAN)), or can itself create data files (e.g., using a word processor program) to be temporarily stored on the hard disk drive, and then such data files can be transferred to the printer 30 as needed.

Ink jet printer 30 also comprises a microprocessor 32, ROM 34, RAM 36, along with an address bus 40 and a data bus 42. Printer 30 also includes a special function ASIC (application specific integrated circuit) 38 which is integral to the handling of the print data as it received from the host computer and until it is printed. The communications link 24 is connected to an input/output port 44, which preferably comprises a parallel communications port having a bi-directional capability. I/O port 44 is then connected to an input buffer 46, which is further connected to a data bus 48 that communicates the incoming print data from input buffer 46 to ASIC 38.

The handling of the print data by ASIC 38 is ultimately controlled by a computer program operating on microprocessor 32. On some printers, the incoming print job data is of a high level language (such as PCL) and must undergo a raster image processing (RIP) step before being further transferred to the print engine. In such situations, microprocessor 32 will control the RIP and will temporarily store the high level language print job data in a portion of RAM 36, while also storing the by-product created by the RIP in a bitmap format, also in another portion of RAM 36. This bitmap data will eventually be transferred through ASIC 38 to the print engine. If the print job data arrives in a bitmap format from host computer 10, then it may be possible for the print data to directly be transferred from input buffer 46 through ASIC 38 to the print engine 70, assuming that all of the components of printer 30 are prepared for that data transfer to occur at a given moment. Under normal circumstances, the print engine cannot keep up with the transferred data incoming at I/O port 44, and this data must, therefore, be sent via ASIC 38 into RAM 36 for temporary storage until the print engine is ready to accept more data.

On FIG. 1, the print engine is diagrammatically designated by the index numeral 70 and includes a printhead 72, a paper motor driver circuit 80 and a carrier motor driver circuit 82. These major components of print engine 70 are controlled by ASIC 38 via various electrical signals, transferred in the case of printhead 72 by a control bus 74, data bus 76, and address bus 78. In a preferred ink jet printer 30, printhead 72 would actually comprise two separate columns of ink-emitting nozzles (and therefore, is essentially equivalent to two separate printheads mounted on a common carrier), and control bus 74 would therefore include two sets of heater lines and two separate chip enable lines, as well as a common set of power supply lines. Both the paper motor driver 80 and carrier motor driver 82 are preferably stepper motor drives, and are controlled by signal lines 84 and 86, respectively, which are further signals that are derived from ASIC 38.

Printer 30 preferably also contains a "control panel," designated by the index numeral 60. Control panel 60 generally represents the various switches and lamps that are accessible by a user at the front panel of printer 30. The switches and lamps are communicated to or from ASIC 38 by a set of I/O lines 62.

The physical location of the carrier (not shown) that moves the printhead of printer 30 in the horizontal direction is detected by an encoder, diagrammatically designated by the index numeral 52 on FIG. 1. Encoder 52 creates quadrature signals that are transmitted by wires 54 to an encoder circuit 50. The encoder circuit conditions these quadrature signals and further transmits them along conductors 56 to ASIC 38, and through these signals the precise position of the printhead is known at all times within one part of 300 or one part of 600 of an inch, depending upon the resolution of printer 30 in the horizontal direction. This information is not only used in controlling the carrier motor drive 82, but also in controlling the on and off actuations of the ink nozzles in printhead 72.

In a preferred printer, such as a model number "WinWriter 150c" manufactured by Lexmark International Inc. located in Lexington, Ky., the print job information arriving from the host computer will already be in a bitmap format. The original data file, whether it is a word processing character file or some type of graphical data file in PostScript or PCL, will be RIPed in the host computer by a special "driver" program used with the particular type of printer, and the resulting bitmap will be output at I/O port 18 and then communicated through the communications channel 24 into the corresponding I/O port 44 on printer 30. As related above, in conventional printers this bitmap information may well comprise a large rectangular array of pels that are essentially as large as the entire sheet of paper for which a representation of the print job is to be imparted. Generally speaking, the print job data is transferred from input buffer 36 through ASIC 38 into RAM 36 for temporary storage. At times when printhead 72 is in the correct position, the "firing logic" of ASIC 38 will be turned on so that ink dots will be emitted by the nozzles of printhead 72 onto the paper or other print media upon which the image representation is to be placed. When the ASIC 38 is turned on, it "grabs" print data by DMA (direct memory access) from RAM 36 using information stored in another table of RAM 36 that provides ASIC 38 with the memory address of the beginning address in RAM 36 containing the print data, and also the "print start position" (i.e., the slice location) for the current swath that is about to be printed by printhead 72. ASIC 38 compares the print start position to the present carrier position, which is the actual present position of printhead 72, as provided by encoder circuit 50. Once this comparison becomes true (see more detail below), then the print engine 70 will begin the process of causing ink to flow through the print nozzles of printhead 72 onto the paper or other print media.

At times when the printhead 72 is turned off, i.e., when no pels are to be placed on the print media, then it is preferred that the firing logic in ASIC 38 be shut down until needed for the next print operation. This is described in greater detail hereinbelow.

Figure 2:
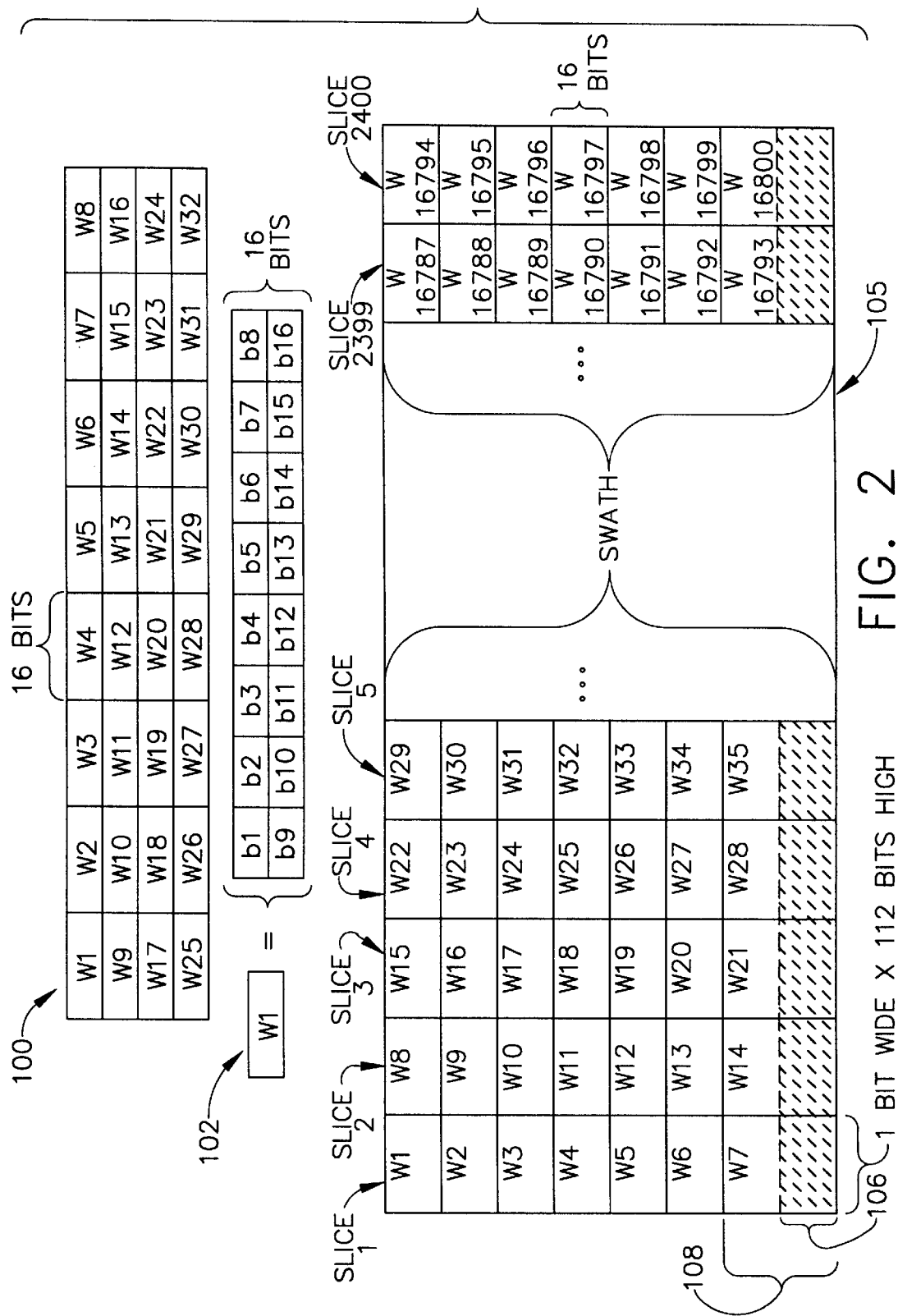
FIG. 2 is a diagrammatic view of print data as it is stored in memory and as it is rotated to create a swath of bitmap data to be printed by a nozzle array in an ink jet printer constructed according to the principles of the present invention.

In FIG. 2, index numeral 100 designates a graphical representation of memory elements that could be found in either RAM 16 of host computer 10 or RAM 36 of printer 30. Each of the rectangles in "block" 100 represents a data word, which in turn represents sixteen (16) bits of binary information. As seen in the diagrammatic block 102 on FIG. 2, the first word designated "W1" represents 16 bits, designated "b1" through "b16."

It is typical to represent memory locations and binary information that is being stored in memory locations in a manner similar to that shown on portions of FIG. 2 at numerals 100 and 102. In other words, if a series of binary data presents itself to a communications port or to some type of memory device such as a RAM chip, hard disk drive, address bus, or data bus, then it is typical to represent this information as a series of either binary or hexadecimal numbers that are typically grouped in either bytes or words. These bytes or words are typically then grouped horizontally across a printed page (when viewing such information on a printout or a monitor screen) until the binary or hexadecimal numbers come to the end of a line on that page, after which any further binary or hexadecimal data is moved down to the next line, beginning along the left-hand border and continuing toward the right border. However, when using such binary or hexadecimal data with ink jet printers, or other printers using some type of array of light emitting diodes or other transducing devices that will ultimately create a dot on some type of print media, the print job information is typically rotated 901 (known as a "delta rotation") so that the consecutive data stream that is to be stored in memory represents vertical information rather then some type of horizontal representation of the image to be printed. In other words, the consecutive binary information as seen in the top row of the binary data shown at index numeral 100 becomes rotated to become "SLICE 1" of the swath 105, depicted at the bottom of FIG. 2.

In an exemplary example using a printhead that contains 104 vertical nozzles to that are spaced apart by $\frac{1}{300}$ inch (thereby providing a 300 dpi resolution), a swath of data would require at least 104 binary bits of data to define all the pels of an entire single slice for that swath. When using data words of 16 bit size each, each slice would require 6.5 such data words, which would produce 16×6.5=104 data bits to represent the same 104 pels for that particular slice. For SLICE 1, these words are represented by the symbols W1, W2, W3, W4, W5, W6, and W7.

Since most modern microprocessors have registers that are at least sixteen (16) bits wide, it is easier to write a computer program that uses entire 16-bit wide data words rather than only portions of words, and therefore, it is preferred to use seven (7) entire words to represent SLICE 1 than to attempt to "save" the last eight bits of the seventh word W7 for some other data storage purpose. Therefore, the seventh data word, designated by index numeral 108, will be used in its entirety to represent a portion of SLICE 1, and its last eight bits designated by the index numeral 106, will essentially be wasted space in memory, insofar as representing any type of bitmap print data. Of course, the computer programmer could potentially arrange to use the last eight (8) bits of the seventh data word for each of the slices for some other purpose, such as error checking, but that would increase the complexity of the computer program as well as slow down the processing speed of printer 30, mostly by requiring microprocessor 32 and ASIC 38 to perform other operations using these eight data bits at times when these components would be better used to quickly and efficiently transfer data to the print engine 70 during times when printhead 72 has been activated.

As can be seen on FIG. 2, SLICE 2 comprises seven (7) additional data words, designated W8–W14, in which the last eight (8) data bits of W14 are not used to contain any pel binary data to be used in the final printed rendition of this print job. Each additional slice also contains the same type of format of seven data words. Swath 105 represents an eight-inch wide representation (at 300 dpi in the horizontal direction), and therefore, contains 2400 slices. As can be seen on FIG. 2, slice 2400 contains seven data words, designated W16794–W16800. As before, each of these data words contains 16 bits, in this case representing 16 vertical nozzle positions on the printhead, and the last word W16800 only uses its first eight bits of information (i.e., to control the last eight (8) nozzles) to help create the printed representation of this swath 105.

Figure 3:
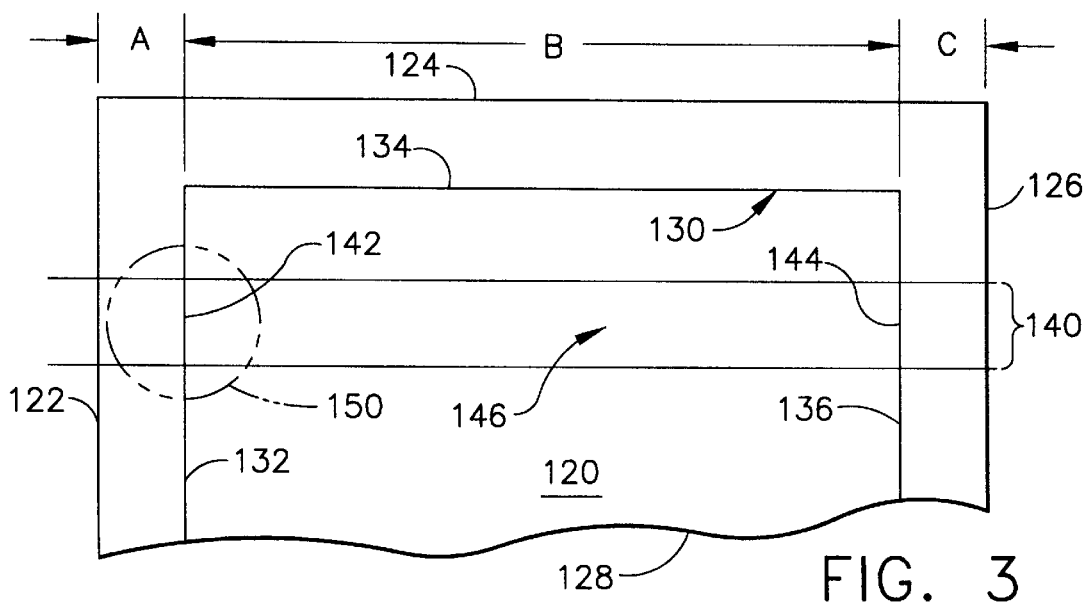
FIG. 3 is a front view of a portion of a printed page showing a swath of print data on that printed page, and described using the principles of the present invention.

In FIG. 3, a portion of a printed page is designated by the index numeral 120. To illustrate an important aspect of the present invention, it will be assumed that a single pel-width line is to be printed on page 120, and this single pel-width line, designated by the index numeral 130, is to contain three separate segments, a vertical segment 132, a horizontal segment 134, and another vertical segment 136. For the purposes of this illustration, it will be assumed that segment 134 is eight inches long, and is equivalent to dimension "B" as shown on FIG. 3. Page 120 is to be 8.5 inches wide, and therefore, dimension "A" is equal to 0.25 inches, and dimension "C" is similarly equal to 0.25 inches. The left-most edge of page 120 is designated by index numeral 122, the right-most edge by index numeral 126, the top-most edge by index numeral 124, and the cut-off edge by index numeral 128.

Figure 4:
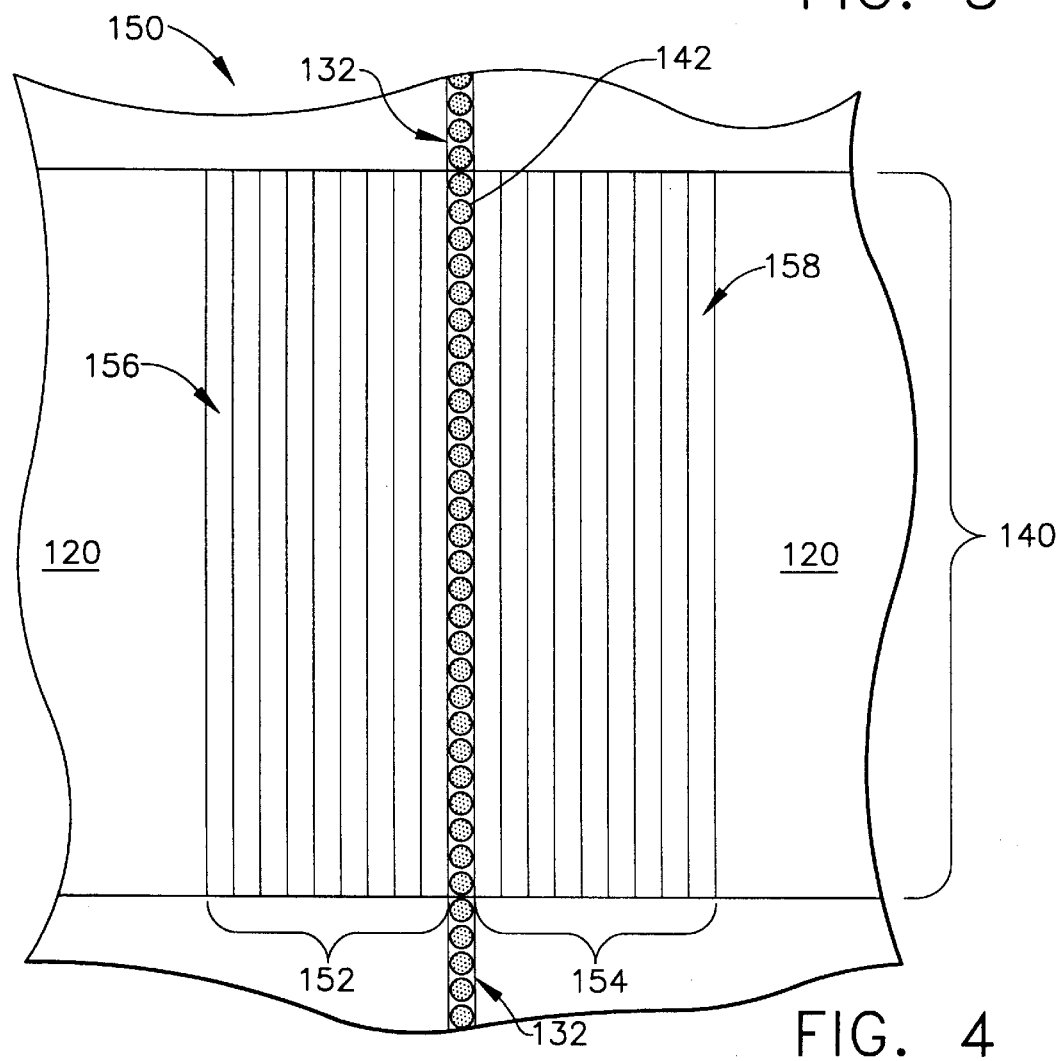
FIG. 4 is magnified front view of a portion of the printed page of FIG. 3.

The horizontal space between two parallel horizontal lines, designated by index numeral 140, designates a swath of print data that has been imparted onto page 120. In the above example, swath 140 will be approximately ⅓ inch in width (or height), using a printhead having an array of 104 nozzles at 300 dpi resolution. As can be seen in FIG. 3, swath 140 only needs to print at two (2) slice locations across the entire page 120, i.e., at slice location 142 and slice location 144. The details at the left-hand slice 142 are presented in a magnified view as seen in FIG. 4 at the circle 150. In FIG. 4, it can be seen that line segment 132 represents a single slice-width line of printed pels that run vertically across page 120. The line segment 142 represents the slice of pels that are contained within slice 140, and this line segment 142 is a sub-set of line segment 132. It will be understood that all 104 pels of this slice are not individually depicted on FIG. 4, to clarify this illustration.

In many conventional ink jet printers the entire swath 140 would not be RIPed into an 8.5 inch wide set of slices to form the image seen on FIG. 3. Instead, the left-most slice (i.e., slice 142) and the right-most slice (i.e., slice 144) would be determined, and all of the area of the page within swath 140 to the left of the left-most slice 142 would be ignored, and all of the area of the page within swath 142 to the right of the right-most slice 144 also would be ignored. However, in the conventional printers, all of the slices between the left-most slice 142 and the right-most slice 144, inclusive, would be transferred to the print engine to print the two vertical line segments 142 and 144 for this swath 140. In other words, there would be required eight (8) inches worth of slices, numbering 2400 slices at the 300 dpi resolution of this example, presented to the print image merely to print only two (2) slices. While the Nagata patent (U.S. Pat. No. 5,237,645) initially ignores "empty blocks," it nevertheless completely fills in such empty blocks before that data is sent to the print engine. Nagata's method may save considerable memory when used in the example of FIGS. 3 and 4, however, that savings does not translate to the operations of the print engine itself.

In the present invention, as will be more fully described hereinbelow, not only are the portions of the page in swath 140 to the left of slice 142 and to the right of slice 144 ignored, but the entire portion of swath 140 between slices 142 and 144, as designated by the index numeral 146 and having the same size as dimension "B," essentially are also ignored, both insofar as memory storage concerns and for printhead operations concerns. In a perfect world, to print swath 140 the printhead 72 need merely be positioned over slice 142 and then spray its row of black dots to create the necessary vertical column of pels on the printed page 120 at that location, then index over to the position for the right-most slice 144 and similarly print another set of black dots to represent these pels. Realistically, however, typical printheads do not have perfectly vertical arrays of nozzles, but instead these nozzles have a somewhat offset pattern so that they are arranged in a diagonal manner. Therefore, to print a perfectly vertical row of pels at slice 142, printhead 72 needs to physically move a short horizontal distance so that each of its offset-pattern nozzles has a chance to travel over the horizontal location represented on the paper at slice 142. To do so, "padding" is added both to the left and to the right of slice 142 so that the movements of printhead 72 can be controlled throughout all of its necessary horizontal positions to enable each of the nozzles to print as at the proper vertical location along slice 142.

Using current technology, it is preferred that this padding have a minimum size of twenty (20) slices, and these are represented by the slices 152 to the left of slice 142, and slices 154 to the right of slice 142. As seen in FIG. 4, the left-most padding slice is designated by the index numeral 156, and the right-most slice is designated by the index numeral 158. Of course, it will be understood that no printed pels are laid down within any of the padding slices 152 or 154, and that the slices are merely defined to enable a high resolution nozzle array to successfully print all of the necessary dots to create a printed slice 142 while going through a small horizontal translation to enable each of the necessary nozzles to achieve its correct location at the time of spraying ink upon page 120.

By using the compacting method as described in FIGS. 5A, 5B, and 5C it can be seen that the example of FIG. 3 would provide an extremely high data compacting ratio by reducing the number of slices in swath 140 from 2400 to only two (2). This ratio, of course, ignores the padding that typically would be required for printheads having nozzles arrays that are not perfectly vertical (as is typical in such printheads). Even with the required padding 152 and 154, the present invention still achieves a considerably high compacting ratio of 2400 slices to only forty (40), which is a compacting ratio of 60 to one (60:1). This is based on the total number of slices in the swath of 2400, divided by the total number of slices in the two padding groups at both the left line segment 132 and the right line segment 136, which is a total of forty (40) slices (twenty per line segment). This, of course, is an extreme example, but it is useful to help visualize the beneficial effects of the present invention.

More details of the benefits of the present invention are illustrated on FIGS. 5A, 5B, and 5C. These examples all ignore the concept of the need for padding for simplicity's sake while discussing the manipulation of data using the method of the present invention. On FIG. 5A, a rectangle is depicted showing a swath 200 of data in the format of an original bitmap. In this example, the vertical width (or height) of swath 20 is only ten (10) pels. The left-most slice is designated at index numeral 202 and the right-most slice is designated at the index numeral 204. The initial bit pattern to be printed, when traveling from left-to-right, is designated by the index numeral 206, and this bit pattern is referred to as an "area" as will all other similar bit pattern groupings that are to be printed (i.e., such areas will contain non-blank slices). Following from left-to-right, the first slice after area 206 is empty of pels to be printed, as are several of the next consecutive slices, and this is a large enough grouping of consecutive blank slices to be termed a "void," designated by the index numeral 208. Not every set of consecutive blank slices will be considered to be a "void" and this term will be reserved only for a large enough area of consecutive blank slices that exceeds a pre-determined threshold amount of such blank slices. In the example presented in FIG. 5A, the value for this threshold is chosen to be equal to the number ten (10), and since void 208 contains seventeen (17) consecutive blank slices, that certainly exceeds the threshold value of ten.

After passing through the entire void 208, a second grouping of bits to be printed is encountered and is designated by the index numeral 210. After these pels are printed in swath 200, another grouping of consecutive blank slices is encountered, designated by the index numeral 212. Since the number of consecutive blank slices in "grouping" 212 is less then the threshold value of ten (10), grouping 212 does not qualify as a void. After passing through grouping 212, another series of print data containing pels to be printed is encountered, at index numeral 214. Thus an "area" is formed between two (2) voids 208 and 216, and this area includes print grouping 210, blank grouping 212, and print grouping 214.

Continuing to the right in swath 200, a void 216 is encountered which contains a number of consecutive blank slices that is greater than the threshold value of ten (10). After passing through void 216, another set of print data containing pels to be printed is encountered, designated by the index numeral 218. As can be seen on FIG. 5A, the print group 218 contains the right-most slice 204, and the system is, therefore, finished inspecting this swath 200.

Using the principles of the present invention, the original bitmap data contained in swath 200 is compacted into a swath of information that mainly contains slices having pels that are to be printed. This is done by eliminating the voids that existed within swath 200. The result is a swath 220, depicted in FIG. 5B, in which the print group 206 is directly butted against the slices of the print group 210. As can be easily seen, the blank data contained in void 208 in swath 200 has been eliminated in swath 220, and therefore, the right-most slice of print data group 206 is placed adjacent (in memory) to the left-most slice of the print data group 210. It will be understood that each slice of data in swath 200 or swath 220 comprises ten (10) data bits or pels in this example, which can be depicted by a single data word containing 16 bits. In an actual application using a slice that contains 104 pels, seven (7) words of data are required to store a sufficient number of bits to represent that number of pels.

Regardless of the size of the slice, (i.e., the number of pels or bits contained in a particular slice), the data for each individual slice can be moved around in memory by keeping track of their beginning memory locations, and this is typically done in computer programming by the use of a "slice pointer." It will be further understood that the computer program can increment or decrement the single slice pointer by using appropriate commands in the computer program and, depending upon the size of the vertical slice, incrementing by one (1) slice pointer could actually be incrementing by more than one (1) data word. For example, on FIG. 2, if the slice pointer were pointing at the first bit of SLICE 2, that slice pointer would have to increment by seven (7) words before arriving at the appropriate memory location to designate SLICE 3.

The blank grouping 212 still remains within swath 220, because it was not large enough to be considered a void. Therefore, the right-most slice of print data group 210 does not abut the left-most slice of print group 214. In swath 220, however, the right-most slice of print group 214 is abutted against the left-most slice of print group 218, thereby wasting no space for consecutive blank slices within this swath.

According to the present invention, the right-most slice of print group 218 is the last section of memory required to define the entire original swath 200. Quite a large amount of memory space is thereby saved, designated by the index numeral 222, which can be used to store print data groupings from other swaths that will be part of this print job. It will be understood that, of course, one cannot merely ignore the fact that the original voids 208 and 216 existed in the original swath 200. It is preferred that the slice location at the beginning and end of each area that was originally found in swath 200 be stored in a separate memory table, and this information will be used to issue commands to start print and stop print at appropriate times. Depending upon whether this method of compacting the bitmap data will be accomplished at a host computer or within the printer itself, the compacted bitmap data and the associated table of slice locations where start print and stop print commands will be stored will either exist in the RAM of the host PC, such as RAM 16 in host computer 10, or the RAM of the printer, such as RAM 36 of printer 30. The methodology involved in these two options will be more fully discussed hereinbelow, specifically in connection with FIGS. 8 and 9.

The compacted bitmap data can obviously fit into a much smaller area of memory then the non-compacted, original bitmap data, and therefore, essentially more then one "page" of bitmap data can be stored into an image memory table that was originally designed to store only a single page of data. Of course, this compacted data must later be "uncompacted"

before being printed, and the result is swath 230 as shown in FIG. 5C. When the printer is ready to print the swath that was originally designated in FIG. 5A as swath 200, it first finds the horizontal location of the left-most slice 202. After indexing the printhead to that location 202, the printer now does two (2) things: first it issues a "start print" command to occur at the location designated by the index numeral 232 on FIG. 5C. By doing so, it enables (or "turns on") the firing logic of ASIC 38, and it can now read the bitmap data from the memory to obtain the print data group of area 206. By now, RAM 36 would be storing print data group 206, regardless of whether or not the data compacting procedure occurred at a host PC or within the printer itself. As the printhead 72 is indexed to the start print position 232, it begins to print pels at the left-most slice 202. The appropriate pels are printed according to the bitmap data for area 206, and at the end of that group, a stop print command is issued to ASIC 38 at the location designated by the index numeral 234.

Once printhead 72 has reached the stop print command position at index numeral 234, the firing logic for ASIC 38 is turned off (i.e., disabled) while printhead 72 traverses over the void 208. By use of the encoder circuit 50, printer 30 knows that printhead 72 must begin printing again at the time it reaches the next area at the left-most slice of the print data group 210. Therefore, the desired point (i.e., slice location) where the printing should begin is compared to the actual printhead position to determine when the firing logic of ASIC 38 should again be enabled. These logical procedures are described in greater detail hereinbelow in connection with the flow chart provided on FIGS. 7A and 7B.

When encoder circuit 50 indicates that printhead 72 has reached the left-most slice of print data group 210, another start print command is given at the index numeral 236, which again enables the firing logic of ASIC 38. As seen in FIG. 5C, the ASIC 38 remains enabled until reaching the next stop print command at the index numeral 238. During the horizontal travel of printhead 72 from start print command position 236 ito stop print command position 238, the printhead will print pels for print data group 210, then print no pels for the next four slices at blank group 212, then again print pels for the print data group 214.

This example provides a clear indication of the definition of the term "area" in connection with the present invention; both print data groupings 210 and 214 are part of the same area even though they are separated by more than one consecutive blank slice. The reason for this, of course, is because the number of consecutive blank slices (of the original blank grouping 212) is less than the threshold value of ten (10) slices. Therefore, when printhead 72 passes over this area, it will be supplied with "print data" from ASIC 38 not only for all of the pels to be laid down in print data groups 210 and 214, but also will be provided with pels for the blank slices of blank group 212 between these two print groupings. Of course, the blank slices are not actually printed on the print media, but as far as printhead 72 is concerned, those blank slices are indeed being "printed" insofar as the operations of data transfer that are required to control the movements of printhead 72 and the commands being transferred from ASIC 38.

After printhead 72 passes through the stop print command location 238, ASIC 38 again turns off to pass over the next void at index numeral 216. The encoder circuit 50 again keeps track of the actual printhead location, and when that location becomes the left-most slice of area 218, a start print command at location 240 is issued. The firing logic of ASIC 38 again turns on, and transfers print data to printhead 72, which lays down a pattern of pels according to the bitmap print data of area 218. At the right-most slice of area 218, a stop print command is given at index numeral 242, and the firing logic for the ASIC 38 is again turned off. It so happens that the right-most slice of print data group 218 is equivalent to the right-most slice of swath 230, and there will be no further pels printed on this swath. Therefore, the printhead 72 can be indexed to the next swath to be printed on this page.

Figure 6:
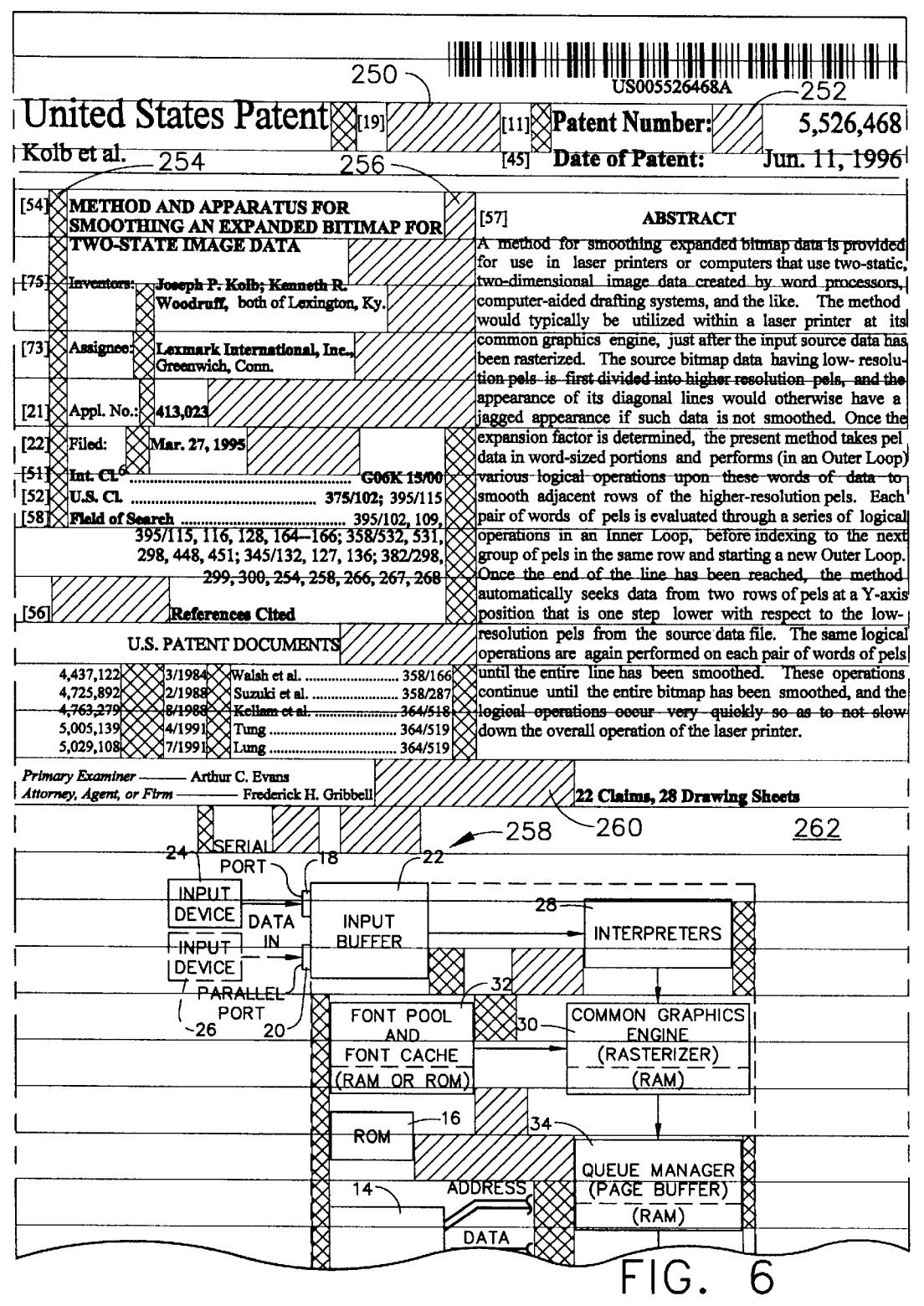

FIG. 6 provides a real world example as to what types of blank spaces can be designated as "voids" for use in saving image memory space according to the present invention. FIG. 6 provides a partial rendition of the front page of a U.S. patent which is sub-divided into swaths that are approximately ⅓ inch in height. Assuming 300 dpi resolution in both the horizontal and vertical directions, and assuming that the threshold value is equal to 100, then the smallest possible void size would be ⅓ inch in horizontal distance. In view of this fact, the smallest possible void with this set of parameters would be approximately in the shape of a square, ⅓ inch by ⅓ inch. Such a square is indicated at index numeral 256, which also shows diagonal shading lines to more easily see that area. Other voids on FIG. 6 are also indicated by the diagonal shading, and include voids 250 and 252 in the third swath from the top of the page.

If the threshold value were decreased sufficiently, then another void area could be as shown by the rectangle containing cross hatching at the index numeral 254. As can be easily seen on FIG. 6, rectangle 254 is less than one-half the width necessary to contain enough slices for a threshold of 100, and therefore, would not be considered a void unless the threshold value was reduced to a number less than 50 at this resolution.

One location that does not define a void is shown at index numeral 258 which points to the number "22" near the middle of the page on FIG. 6. As can be seen, to the right of the numeral 22 are a large number of blank slices within the swath 262 that contains the index numeral 258. However, there are no pels to the right of this location that need to be printed within swath 262 and, therefore, the right-most slice within that swath is located at the right edge of the numeral 22 on swath 262. This is just the opposite of the immediately adjacent swath containing the void 260, in which void 260 runs all the way up to the left-most slice that begins the phrase, "22 Claims, 28 Drawing Sheets".

For printers that use a single speed to index their printhead position along the carrier, the primary advantage of the present invention is to save space in the image memory of the printer by storing the compacted bitmap data rather than storing the original non-compacted bitmap data. Furthermore, if the compacting procedure takes place in a host computer (rather than in the printer itself) then additional savings are achieved as follows: (1) the memory space within the host computer that stores the RIPed bitmap data will be able to store more pages of information by storing the compacted bitmap data instead of the original, non-compacted bitmap data; (2) when this bitmap information is transferred to the printer over a communications link, such as a direct cable connection as in communications link 24 on FIG. 1 or via a local area network (LAN), then the communications time interval required to transfer this data will also be reduced by the same factor as by the reduction in memory storage space required to store the compacted bitmap data as compared to the non-compacted bitmap data; and (3) the memory system in the printer itself will be able to store more of the compacted bitmap data at all locations within the printer, starting at the input buffer 46, the RAM 36 (which will contain the image memory table), and finally the amount of data sent to the print engine 60 via the data bus 76.

If the printer being used additionally has the capability of operating its carrier motor drive at two (2) different speeds, then an additional savings can be achieved using the principles of the present invention. In the example provided in FIG. 5C, the swath 230 would require the printhead to pass over area 206 at its normal printing speed, however, once ASIC 38 has received its stop print command at 234, the printhead carrier could be driven at a higher speed to pass over the void 208 since no actual printing needs to take place. As the printhead approaches the next start print command (at 236), then of course, the print carrier drive motor must reduce its speed back to the normal "printing" speed as it passes over the area that comprises the print data group 210, blank group 212, and print data group 214. As related above, the printhead 72 must literally "print" the entire area, including the blank group 212, since the printhead receives bitmap print data for that blank area 212, even though no pels are literally being printed, (in view of the fact that blank area 212 contains all zeroes).

If the threshold were specified to have a value for consecutive blank slices equal to one (1), then every blank slice would be considered to be a "void" and there would never be a "non-void" blank group of slices such as group 212 on FIG. 5C. However, this is an unrealistic scenario, because the processing time required to store the start print command and stop print command locations for each such blank slice would take more time then it would require for the printer to merely process that blank slice as normal print data. Even worse, because of its On- and Off-response times the printhead could literally not be turned off, then back on quickly enough to pass over a single blank slice and be physically ready to print again at the next non-blank slice.

Based upon these considerations, it will be understood that the appropriate threshold value that determines the minimum void size (in numbers of consecutive blank slices) will likely be different for each printer that is constructed using the method of the present invention. The primary considerations are: (1) the processing speed capabilities of microprocessor 32 and ASIC 38, (2) the On-response time and Off-response time for energizing and deenergizing printhead 72, along with its associated firing logic of ASIC 38, and (3) the speed of the carrier motor drive that controls the movements of printhead 72. In FIG. 6, the example threshold was equal to 100 consecutive blank slices for the larger areas, such as areas larger than area 256. Also on FIG. 6, other areas, such as area 254, were illustrated that could be classified as voids, however, either the printhead carrier speed would have to be reduced or the response times for energizing and deenergizing the printhead would have to be reduced in order to allow such smaller amounts of consecutive blank slices to be classified as voids.

Furthermore, it will be understood that a given threshold value that sufficiently works well for a printhead that moves at a single speed along its carrier, whether printing or passing over a voids, likely would not be sufficiently large in a situation where the printhead moves along its carrier at a higher speed when passing over voids. In the second situation, the threshold value would need to be increased to allow for the fact that the higher velocity of the printhead passing over voids would require a greater amount of time (which translates into a greater number of blank consecutive slices needed) required to both accelerate and decelerate the printhead's movements while it crosses the void. Of course, one could design the printer along a variation of this theme by allowing a lower threshold value, such as 100, while keeping the printhead's movements at the lower operating speed for crossing both areas and voids, then having a second threshold value larger then the first (such as 300) that, when exceeded by a particular void, allows the printhead to cross that void at the higher operating speed (when not printing).

Figure 7A:
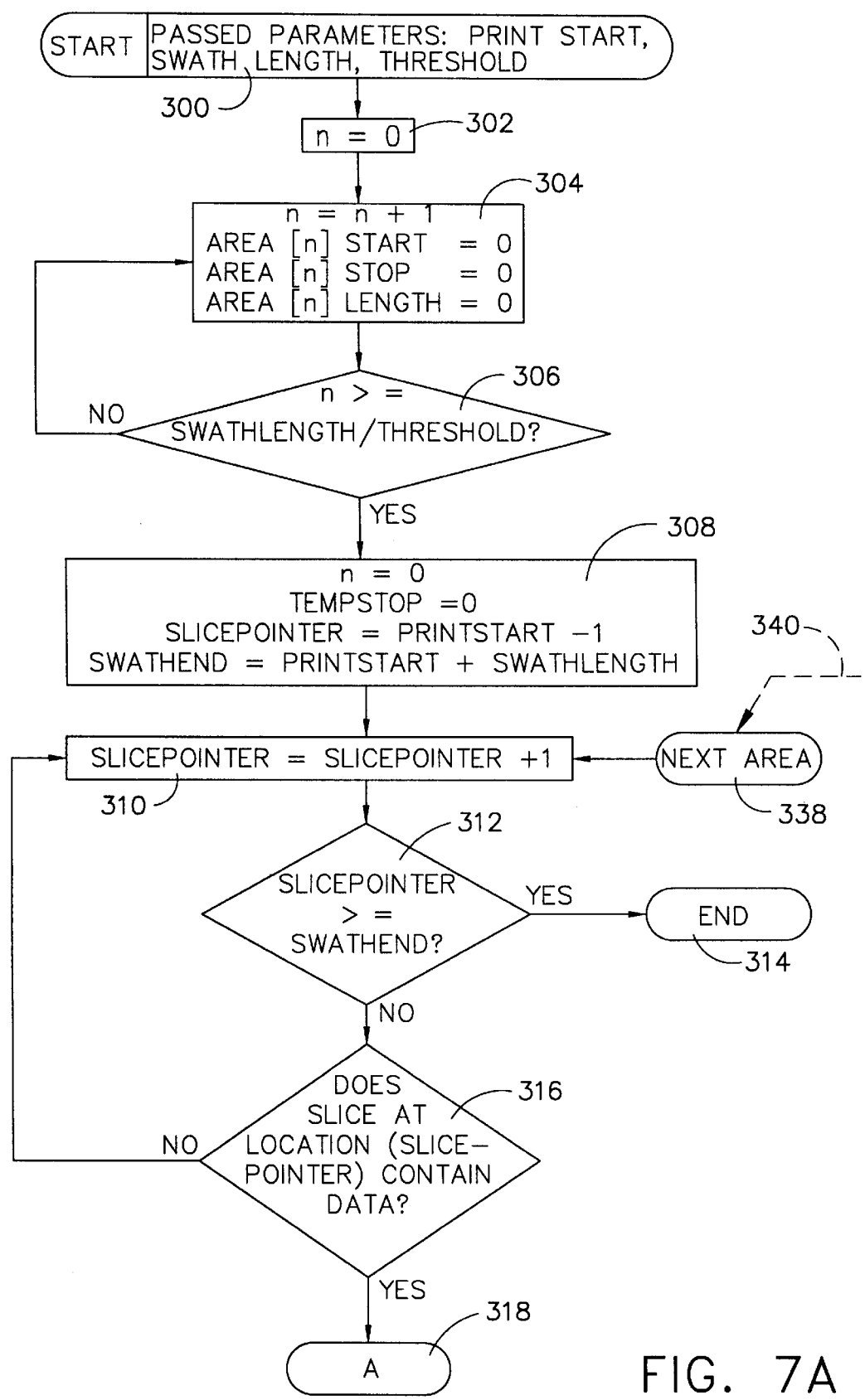
FIGS. 7A and 7B are a flow chart showing the details of the bitmap compacting method according to the principles of the present invention.
Figure 7B:
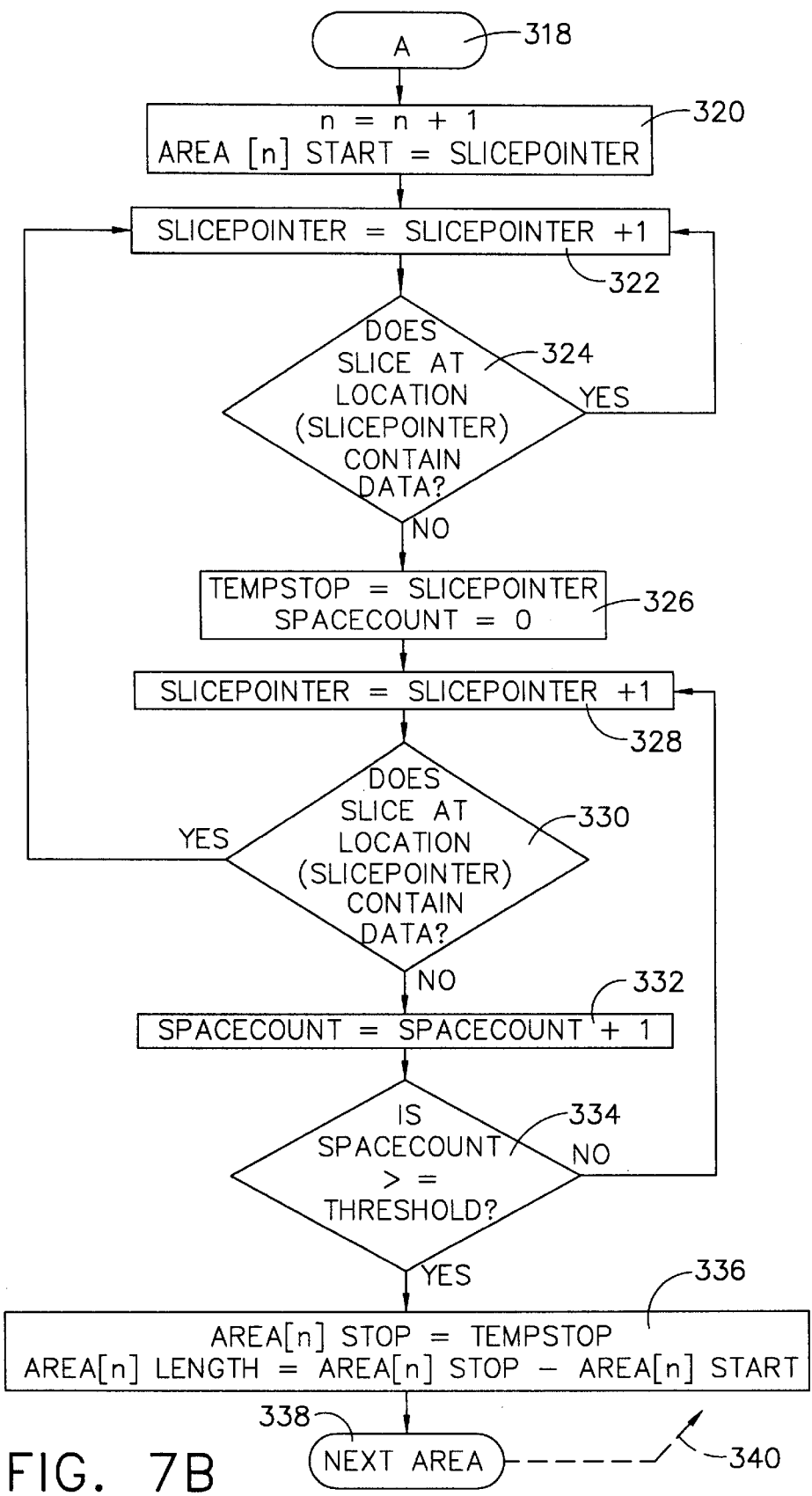

FIGS. 7A and 7B represent a flow chart that describes the detailed logical operations required to perform the data compacting method in accordance with the principles of the present invention. This flow chart generally represents a subroutine or a function call that would be used as a "module" in building up source code for a computer program and, as related above, this compacting process could be performed either at a host computer (such as host computer 10) or at the printer itself (such as printer 30).

Beginning at a "start" function block 300, certain variables are passed to this subroutine or function call, including the PRINTSTART position, SWATHLENGTH, and the value for the THRESHOLD. It should be noted that this flow chart represents the operations required to compact a single swath, and this procedure is to be performed for each of the swaths of the entire page that will be printed.

As related above, conventional printers have the capability of finding the left-most slice and the right-most slice for each of the swaths. With that in mind, the initial PRINTSTART location, assuming left-to-right movement of the printhead carriage for this particular swath, will be equivalent to the left-most slice of this swath. In this illustrated embodiment this first print start position is designated as belonging to the fast "area," remembering that an "area" was earlier defined as a portion of the swath that contains non-blank print data. This flow chart refers to the areas by a numeral, and that numeral is defined by the variable "n". The value of "n" is initially set to zero (0) at a function block 302.

At a function block 304, the value for "n" is incremented, and three of the variables are set equal to zero. These three variables are given the names AREA[n]START, AREA[n] STOP, and AREA[n]LENGTH. This operation initializes these three variables upon arriving at the left-most slice of the first area on this swath.

At a decision block 306, it is determined if the value for "n" is greater than or equal to the result of the variable SWATHLENGTH divided by the variable THRESHOLD. The values for SWATHLENGTH and THRESHOLD were earlier provided at step 300 as passed variable parameters that were sent to this subroutine by another portion of the computer program that controls the operations of printer 30. The value provided for SWATHLENGTH is equal to the number of slices required to print the entire swath from its left-most slice to its right-most slice. The value provided for the THRESHOLD is equal to the minimum amount of consecutive blank slices that will be allowed to be considered a void. By dividing the SWATHLENGTH by the THRESHOLD, the maximum number of areas for this particular swath can be determined, which is also the maximum value for the variable "n."

Once the maximum number of possible areas for this swath is known, a set of arrays is created in memory to temporarily store the compacted data for this particular swath. As an option, if the value for "n" equals one (1), then this subroutine essentially could be exited at this point, because no data compacting need be performed for such a swath (i.e., there are no voids). These arrays are created by operation of decision block 306, since when the answer to this question is NO, the logic flow travels back to function block 304 which creates three new variables each time this loop occurs. In other words, the first time function block 304 is encountered in this flow chart, it creates three (3) variables called AREA[1]START, AREA[1]STOP, and AREA[1] LENGTH. After function block 304 has been visited once by the logic flow, then decision block 306 can send the logic flow through its NO output back to function block 304, at which time it will now define a new set of three variables called AREA[2]START, AREA[2]STOP, and AREA[2] LENGTH. This continues until the value for "n" becomes greater than or equal to the result of the division that occurs in decision block 306.

At this point, the logic flow travels out the YES output of decision block 306 and arrives at a function block 308. At function block 308 the variable n is set to zero (0), a new variable called TEMPSTOP is set equal to zero (0), and new variable named SLICEPOINTER is set equal to the value (PRINTSTART−1). The variable SLICEPOINTER represents the position in memory that points to the beginning bit of the "top" word of each grouping of words that makes up a single slice. As the value of the variable SLICEPOINTER is either incremented or decremented, the location in memory that is equivalent to that increment or decrement is actually moved by the number of words that comprise a single slice. For example, if the printhead includes an array of 104 nozzles, then each slice will include seven (7) words of sixteen (16) bits each. Therefore, the value of the variable SLICEPOINTER will increment by seven words (which would typically be equivalent to fourteen (14) bytes) each time the SLICEPOINTER variable is incremented by the computer program. At function block 308, variable SLICEPOINTER is set equal to the slice location just one to the left of the left-most slice of this swath, which is represented by the value of the variable PRINTSTART.

Function block 308 also introduces another new variable called SWATHEND, which is set equal to the value (PRINTSTART+SWATHLENGTH). Since the value of the variable PRINTSTART is equal to the slice position of the left-most slice, and the value of the variable SWATHLENGTH is equal to the number of slices in this swath, the result of this equation (i.e., the value of the variable SWATHEND) provides the computer with the slice location of the right-most slice in this swath. This information will be useful later in the process defined by this flow chart. It will be understood that most of the operations in function block 308 could have occurred earlier in this flow chart without affecting the overall logic.

The logic flow now arrives at a function block 310 where the SLICEPOINTER variable is incremented. Throughout the remaining portions of this flow chart, the value of the SLICEPOINTER variable represents the position on the page (i.e., specifically the slice's position in this swath) that is currently being analyzed. Next, a decision block 312 determines whether or not the value of the variable SLICEPOINTER is greater than or equal to the value of the variable SWATHEND. If the answer is YES, then the logic flow is directed to the "end" function block 314, signifying that the system is now finished analyzing this swath of print data and the "control information" created by this flow chart is now sent to the print engine 70. As is described in greater detail below, the type of data that will be sent to the print engine will include the starting location and length information for each of the areas of this swath. This information will be in the format of: (1) for Area #1, the variables AREA[1]START, AREA[1]LENGTH; (2) for Area #2, the variables AREA[2]START, AREA[2]LENGTH; (3) and so on until the system has defined these starting locations and length values for each of the areas in this swath. It will be understood that the minimum number of areas for which these variables are sent to the print engine will be one (1). If the option that was suggested above with regard to decision block 306 is used in case where there is only a single area in this swath, then that option would lead the logic flow directly from decision block 306 to the "End" function block 314, at which time the start and length information for Area #1 only would be sent to the print engine.

If decision block 312 is analyzed producing a NO result, then the logic flow arrives at a decision block 316 that determines whether or not the bitmap information for the slice at the current location (as designated by the current value of the variable SLICEPOINTER) contains any data to be printed. When decision block 316 inspects this slice, it scans all seven (7) words of this slice to determine if any of the bits of the print data within this slice are set to a value of Logic 1. If so, then the answer at this decision block will be YES, otherwise the answer will be NO. If the answer is NO, the logic flow travels back to function block 310, at which time the variable SLICEPOINTER is incremented. Of course, the logic flow then continues to determine if the SLICEPOINTER has now reached the value of the variable SWATHEND at decision block 312.

When decision block 316 answers with a YES result, the logic flow travels to a transfer block 318, designated by the letter "A" which directs the logic flow over to FIG. 7B. On FIG. 7B, the logic flow travels from letter "A" to a function block 320 where the value for "n" is incremented. At this time, the variable AREA[n]START is set equal to the current value of the variable SLICEPOINTER. The first time through this flow chart, the value of AREA[n]START would be equal to the PRINTSTART value, which, since this is for Area #1, causes the actual variable having its value set to be the variable named AREA[1]START. After this occurs, a function block 322 increments the value of the variable SLICEPOINTER.

The logic flow now arrives at a decision block 324 that determines whether or not the slice at the location SLICEPOINTER contains any data to be printed (i.e., whether any of the data words of this slice contain at least one bit having a value of Logic 1). If the answer is YES, then the logic flow travels back to function block 322 where the variable SLICEPOINTER is incremented. This process continues until finally reaching a slice at the present SLICEPOINTER position that does not contain any data to be printed (i.e., all of the words of this slice are set to Logic 0). When that occurs, the logic flow travels out the NO output to a function block 326.

At function block 326, the variable TEMPSTOP is set equal to the current value of the variable SLICEPOINTER. Furthermore, a new variable named SPACECOUNT is set equal to the value zero (0). The variable TEMPSTOP represents a temporary stopping point which may be the end of the current area. What essentially needs to be done at this point is to see if the next consecutive group of blank slices exceeds the threshold value. Therefore, the variable SPACECOUNT is initially set to the value zero (0) and will become incremented every time the system comes upon a new consecutive empty slice. If the value for SPACECOUNT ultimately exceeds the threshold value, then the system determines that there are enough consecutive blank slices to qualify as being a void.

The logic flow now arrives at a function block 328 which increments the value of the variable SLICEPOINTER. Next, a decision block 330 analyzes the next slice (at the current location of the SLICEPOINTER) to determine if the slice contains any data to be printed (i.e., whether any of the words of this slice contain a bit having a value of Logic 1). If the answer is YES immediately, then it becomes obvious that there is only a single slice of blank data and the value for the variable SPACECOUNT will not be incremented to the point where it may exceed the threshold value. In this case, the logic flow is directed back to the function block 322 which, after incrementing the value of the variable SLICEPOINTER, then analyzes the next slice to see if it contains any data to be printed.

If decision block 330 finds no data to be printed at the current slice, then the logic flow travels out the NO answer to a function block 332, which increments the variable SPACECOUNT. After that has occurred, a decision block 334 determines whether or not the value of the variable SPACECOUNT is greater than or equal to the THRESHOLD. If the answer is NO, the logic flow is directed back to function block 328 which increments the SLICEPOINTER variable, then analyzes the next slice to see if it contains any data to be printed. If the answer continues to be NO at decision block 330 for a sufficient number of blank slices, then ultimately the variable SPACECOUNT will finally equal or exceed the threshold value at decision block 334. When that occurs, the logic flow will be directed out its YES output to a function block 336.

At function block 336, the variable AREA[n]STOP is set equal to the value of the variable TEMPSTOP. If the logic flow currently is in the second area, for example, then the actual variable being loaded with the value of TEMPSTOP would be the variable name AREA[2]STOP. Once the AREA[n]STOP variable value is set by action block 336, it becomes clear that there now exists a valid complete area.

Function block 336 also sets the variable AREA[n] LENGTH equal to the value (AREA[n]STOP-AREA[n] START). In the preferred embodiment it is important for ASIC 38 to know both the print start position and the number of slices to be printed for each particular area. Now that the system has acquired both the slice location for the starting point of the area and the stopping point of the area, a mere subtraction will provide the length in slices for that area, which is what the AREA[n]LENGTH variable represents.

Upon arriving at the end of an area, it is time to determine whether or not there are any further areas in this particular swath of bitmap print data. Accordingly, the logic flow is directed to a "Next Area" block 338, which, following the dashed arrow at index numeral 340, directs the logic flow back to FIG. 7A. On FIG. 7A, the function block 338 "Next Area" directs the logic flow to function block 310 which increments the SLICEPOINTER variable. At this point in the flow chart, the value for "n" is now equal to a nonzero value, the value for the variable TEMPSTOP can be ignored until the logic flow reaches function block 326, and the value for SLICEPOINTER will now be analyzed at decision block 312 to see if the end of the swath has been reached. If the answer is YES at decision block 312, then the end of the swath has been reached and the logic flow will be directed to function block 314 where all of the necessary variables concerning each area (i.e., information concerning the area start slice location and the area length in numbers of slices of each area) will be available to be transferred into the memory management software of the printer. This memory management software is designed to automatically know where to put these areas into the print buffer so that the print buffer will contain compacted bitmap data, as shown by swath 220 in FIG. 5B.

Figure 8:
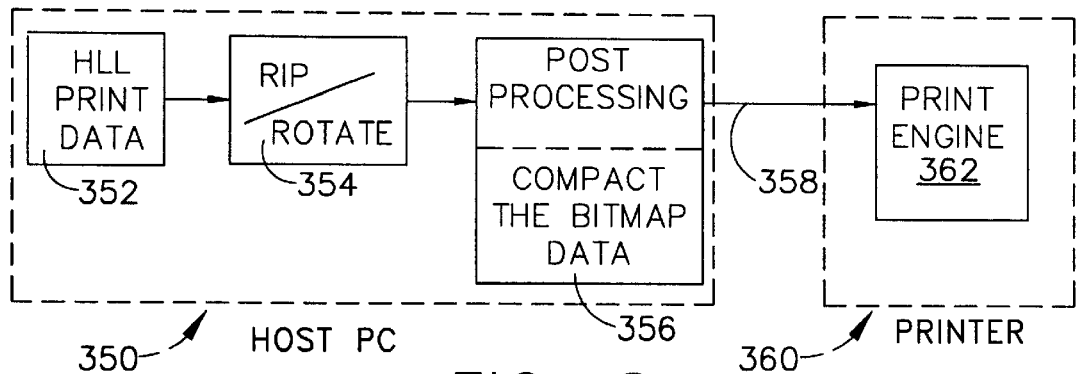
FIG. 8 is a diagrammatic view of the functions required to perform the present invention in which the RIP and post processing compacting data steps, according to the principles of the present invention, are performed in a host computer.

In FIG. 8, a printing system is diagrammatically depicted as having a host computer 350 and a printer 360. Host computer 350 contains the same hardware components as the host computer 10 shown in FIG. 1. Printer 360 contains the same hardware elements as the printer 30 in FIG. 1. FIG. 8 essentially shows the processing steps required by the various components to perform the method of the present invention. Host computer 350 begins with a high level language (HLL) print data file at index numeral 352. This high level language file is RIPed and then rotated to create vertical slices at a software function block 354. At this state, the bitmap created by software block 354 will be a full, non-compacted bitmap, similar to that shown in FIG. 5A. To perform the present invention, a post processing step is required to compact the bitmap data, as shown at a software function block 356. At this stage, the resulting bitmap data is compacted, along the lines of the appearance shown in FIG. 5B.

This compacted bitmap data is then communicated via a communications link 358 to the print engine 362 of printer 360. As related above, as the print engine receives the compacted bitmap data, its ASIC periodically starts and stops the printhead from printing. In addition to the actual bitmap print data, part of the data transferred via communication link 358 must include the individual area start locations and the area length values for each of the areas, so the print engine is properly instructed for each of the swaths to be printed. As related above, this configuration of FIG. 8 is the preferred embodiment for the present invention and takes advantage of the typically greater processing power of a host computer such as a PC as compared to the processing power of the ASIC and microprocessor found in most printers. Of course, a printer driver software module must be installed on the host computer 350 for this system to work. In the case of most ink jet printers, the time required to transfer data for the swaths to be printed will be less than the time required for the printhead to physically print on the paper or other print media for each swath. Therefore, the fact that more bits of information must be transferred from the host computer to the printer when sending down bitmap information when compared to high level language information for the same document to be printed does not slow down the throughput of the system in FIG. 8, according to the preferred embodiment.

Figure 9:
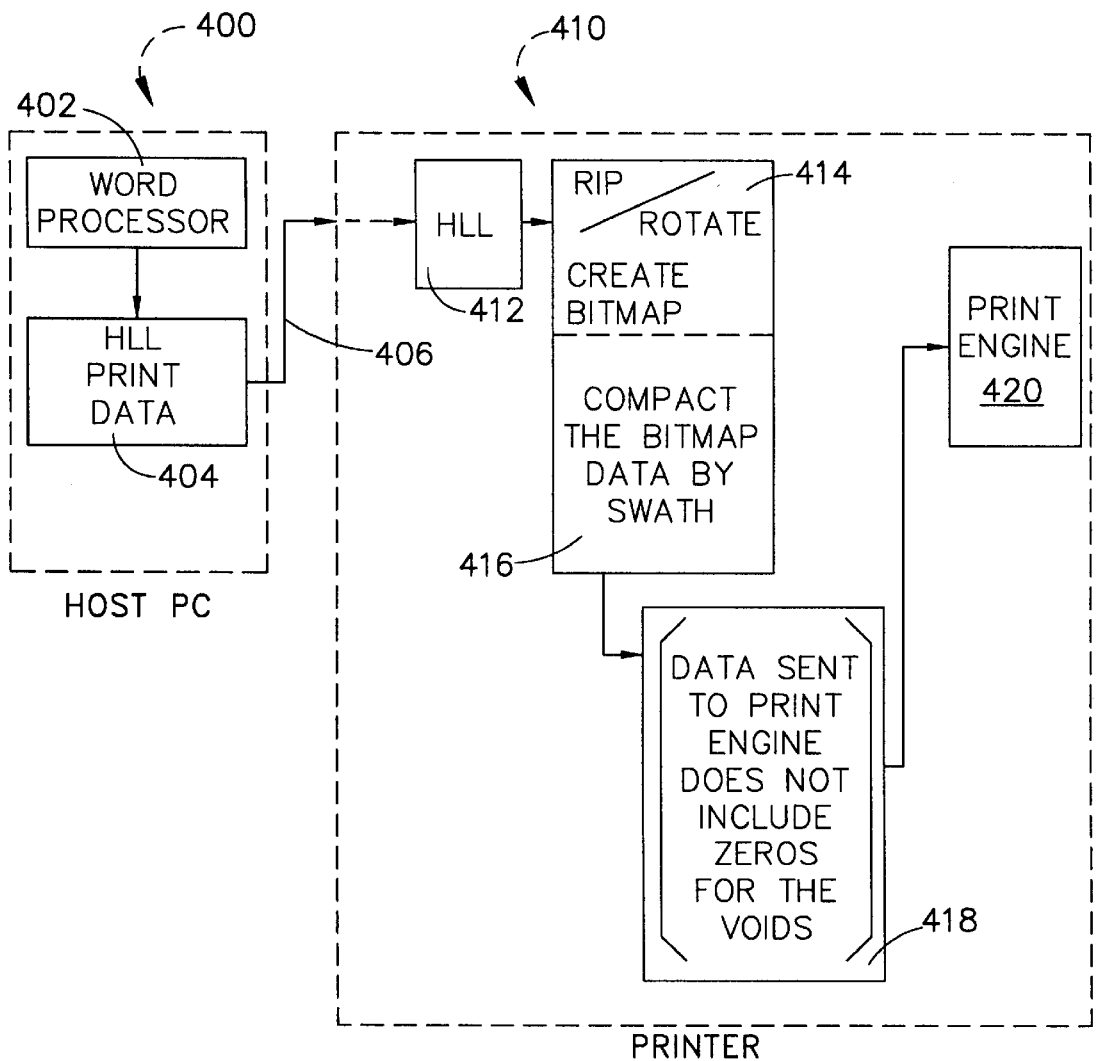
FIG. 9 is a diagrammatic view of the functions that must be performed to first RIP and then compact the bitmap data according to the principles of the present invention when these steps are performed by the printer itself.

FIG. 9 shows a diagrammatic view depicting a printing system having a host computer 400 and a printer 410 in which the method of the present invention is performed within the printer itself. Within the host computer 400 of this example embodiment a word processor program 402 creates a new document that subsequently creates a high level language print data file 404. This high level language file is transferred via a communications link 406 to printer 410.

The high level language data file is received in the printer at a function block 412, after which this file must be RIPed and rotated to create an appropriate bitmap at a function block 414. The printer now compacts this bitmap data, swath-by-swath at a function block 416 according to the method described in the flow chart of FIG. 7A and FIG. 7B. This compacted bitmap data is now ready to be sent to the print engine and does not include large amounts of consecutive zero slices (which are now classified as voids), similar to the swath data 220 in FIG. 5B. This data is sent at a function block 418 to a print engine 420, and finally printed by printer 410.

The embodiment depicted in FIG. 9 has the advantage that the amount of data being communicated through the printer cable 406 (or LAN 406 if a network is being used to transfer the data from the host computer to the printer) in a high level language format that will require a relatively small number of bytes of data to be transferred to represent the entire data file that will later be printed. If the printer has a powerful enough microprocessor and ASIC system, then it can successfully perform the RIP, rotate the bitmap to create the vertical slices for each swath, and then compact the bitmap data swath-by-swath, without slowing down the overall throughput performance of the printer.

Both systems depicted in FIGS. 8 and 9 take advantage of a primary aspect of the invention which is that the print engine does not have to literally "print" all of the consecutive blank slices that make up voids as defined by the present invention. Instead, the print engine in each embodiment is only required to print the areas that contain actual data to be printed on the print media (e.g., paper), after which the print engine can be turned off while passing over voids until arriving at the next area to be printed in each swath of the printed page. Particularly in systems where the carrier motor drive is capable of moving at a higher speed while passing over non-printed areas, an extra advantage lies in creating such voids that do not need to be printed at all, which will increase the throughput of printed pages by either printer 360 or printer 410.

Another advantage in printer design is illustrated in the configuration of FIG. 8 by which the image memory table within the memory system of the printer 360 can contain more data in the compacted format, thereby allowing for a greater throughput by more efficient use of this memory capability. It seems likely that the image memory of realistically-designed printers of the future will always contain at least enough memory capacity to store an entire non-compacted bitmap for a single page, and such memory capacity will likely be overkill for virtually all applications when processing actual print jobs using the present invention's advantages. This will particularly be true for word processing text files that create documents primarily containing words, and also in the case of graphical data software used in printing charts or line drawings. About the only time the compacting method of the present invention may not perform a significant advantage is in the case of pictorial information in which virtually every pel will have a gray scale value other than zero (0). In such cases, the present invention may have no application because there will be very few if any "blank" slices that contain words having only Logic 0 values for all of the bits of each word in a slice. However, even that scenario could potentially be improved by use of the present invention by selecting a minimum gray scale value that will essentially be treated as a zero (0) value, after which there may be enough consecutive blank slices to qualify as a void (and thereby taking advantage of the present invention).

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method of compacting data to be printed, comprising:
   (a) dividing initial uncompressed, uncompacted bitmap print data into a plurality of swaths of print information, each of said swaths containing a plurality of slices, and each of said slices being characterized as being either a blank slice or a data slice, wherein a blank slice contains no pels that are to be printed;
   (b) establishing a pre-determined threshold value corresponding to a minimum number of consecutive blank slices;
   (c) identifying within a first swath of said plurality of swaths a first void of initially unknown size, said void having an actual number of consecutive blank slices which exceeds said threshold value, wherein said first void is bounded by a first region and a second region, wherein each of said first and second regions include at least one data slice, and wherein said void having an actual size that is not constrained to any pre-determined data size; and
   (d) generating compacted data representing said first swath which includes boundary information and print data corresponding to said first and second regions, and which excludes data corresponding to said first void.

2. The method as recited in claim 1, further comprising:
   (e) generating uncompacted data from said compacted data representing said first swath, said uncompacted data being arranged so that uncompacted first and second regions contain at least one data slice to be printed, uncompacted boundary information contains starting and stopping locations defining areas within said first swath to be printed, and an uncompacted first void contains no slices of print data; and
   (f) printing said first swath using said uncompacted data, wherein a printhead is turned on while printing said first and second regions and is turned off while passing over said uncompacted first void, thereby creating a document which has an identical appearance according to said initial print data for the first swath.

3. The method as recited in claim 1, further comprising the step of performing a raster image processing operation to convert an initial data set of a high level language into a bitmap format, thereby creating said initial print data.

4. The method as recited in claim 1, wherein said area boundary information comprises a start printing location and a length value.

5. The method as recited in claim 1, wherein said area boundary information comprises a start printing location and a stop printing location.

6. The method as recited in claim 1, wherein said compacted data comprises a plurality of swaths, and at least one of said swaths comprises a plurality of areas and at least one void therebetween; and wherein each of said plurality of areas includes at least one of:
   (i) bitmap print data containing at least one non-blank slice having pels that are to be represented by printed dots on print media,
   (ii) bitmap print data containing a number of consecutive blank slices that is less than said threshold, and is therefore not a void, and
   (iii) padding.

7. The method as recited in claim 1, wherein said initial print data includes graphical data that is not font character information.

8. A printing system having a host computer, a printer, and a communications link therebetween, said system comprising:
   (a) a host computer having an HC processing circuit, an HC memory circuit, and an HC communications port, wherein said HC processing circuit is configured to compact a first data set of bitmap print data stored in said HC memory circuit by:
  (i) dividing said first data set into a plurality of swaths each containing a plurality of slices,
  (ii) inspecting each of said plurality of swaths to determine whether or not there exists a number of consecutive blank slices at least as large as a predetermined threshold value, and if so,
  (iii) dividing the current swath into a plurality of areas each containing at least one pel to be printed, wherein each said area is separated from other said areas by a void, each said void comprising consecutive blank slices at least as large as said threshold,
  (iv) creating area boundary information for each said area within said current swath, and
  (v) creating a second, uncompacted data set that contains print data associated with each said area of each said swath, said second data set being arranged so that each of said swaths having at least two areas containing print data and a void therebetween additionally contains area boundary information for each said area, but not any print data for said voids between areas,
said HC processing circuit being further configured to send said second data set to said HC communications port;
(b) a communications link that is operatively connected to said HC communications port and that receives data from said HC communications port; and
(c) a printer having a PRT processing circuit, a PRT memory circuit, a PRT communications port, and a print engine, said PRT communications port being operatively connected to said communications link and receiving data from said communications link, wherein said PRT processing circuit is configured to print a representation of said second data set by:
  (i) temporarily storing in said PRT memory circuit said second data set,
  (ii) inspecting said second data set to determine said swaths having at least two areas containing print data and a void therebetween,
  (iii) transmitting, swath by swath, to said print engine the print data and area boundary information for each said area, but not any print data for voids between areas, and
said print engine including a printhead that, for each of said swaths, is configured by said PRT processing circuit to:
  (i) turn on at the beginning of the first of said areas included in the current swath and print slices according to the print data of said first area from said second data set,
  (ii) turn off at the end of said first area,
  (iii) move to each of the next of said areas included in the current swath, including the final of said areas included in the current swath,
  (iv) turn on at the beginning of said next area and print slices according to the print data of said next area from said second data set, and
  (v) turn off at the end of said next area;
thereby printing an entire page which has an identical appearance according to said first data set of bitmap print data.

9. The printing system as recited in claim 8, wherein said print engine includes a printer carriage/printhead assembly, and wherein said printer carriage/printhead assembly moves at a first velocity when passing over each of said areas, and moves at a second, greater velocity when passing over voids between areas.

10. The printing system as recited in claim 9, wherein, to turn on said printhead, an application specific integrated circuit (ASIC) of said PRT processing circuit includes logic that is configured to receive a print start position, read print data by direct memory access (DMA) from said PRT memory circuit, and compare said print start position to the current printer carrier position, then cause said printhead to print according to said print data once the comparison becomes true; and when said printhead turns off, said ASIC logic is disabled.

11. The printing system as recited in claim 8, wherein said second data set comprises a plurality of swaths, and at least one of said swaths comprises a plurality of areas and at least one void therebetween; and wherein each of said plurality of areas includes at least one of:
  (i) bitmap print data containing at least one non-blank slice having pels that are to be represented by printed dots on print media,
  (ii) bitmap print data containing a number of consecutive blank slices that is less than said threshold, and is therefore not a void, and
  (iii) padding.

12. A computing/processing system comprising a processing circuit and a memory circuit, wherein said processing circuit is configured to compact a first data set of bitmap print data stored in said memory circuit by:
  (a) dividing said first data set into a plurality of swaths each containing a plurality of slices;
  (b) inspecting each of said plurality of swaths to determine whether or not there exists a number of consecutive blank slices at least as large as a predetermined threshold value, wherein a blank slice contains no pels that are to be printed, and if so;
  (c) dividing the current swath into a plurality of areas each containing at least one pel to be printed, wherein each said area is separated from other said areas by a void of initially unknown size, each said void comprising consecutive blank slices at least as large as said threshold, and each said void having an actual size that is not constrained to any pre-determined data size;
  (d) creating area boundary information for each said area within said current swath; and
  (e) creating a second, uncompacted data set that contains print data associated with each said area of each said swath, said second data set being arranged so that each of said swaths having at least two areas containing print data and a void therebetween additionally contains area boundary information for each said area, but not any print data for said voids between areas;
wherein said second data set, when printed by a printer, creates a document which has an identical appearance according to said first data set of bitmap print data.

13. The computing/processing system as recited in claim 12, wherein said second data set comprises a plurality of swaths, and at least one of said swaths comprises a plurality of areas and at least one void therebetween; and wherein each of said plurality of areas includes at least one of:
  (i) bitmap print data containing at least one non-blank slice having pels that are to be represented by printed dots on print media, (ii) bitmap print data containing a number of consecutive blank slices that is less than said threshold, and is therefore not a void, and (iii) padding.

14. A printer having a processing circuit and a memory circuit, wherein said processing circuit is configured to compact a first data set of bitmap print data stored in said memory circuit by:

(a) dividing said first data set into a plurality of swaths each containing a plurality of slices;

(b) inspecting each of said plurality of swaths to determine whether or not there exists a number of consecutive blank slices at least as large as a predetermined threshold value, wherein a blank slice contains no pels that are to be printed, and if so;

(c) dividing the current swath into a plurality of areas each containing at least one pel to be printed, wherein each said area is separated from other said areas by a void of initially unknown size, each said void comprising consecutive blank slices at least as large as said threshold, and each said void having an actual size that is not constrained to any predetermined data size;

(d) creating area boundary information for each said area within said current swath; and (e) creating a second uncompacted data set that contains print data associated with each said area of each said swath, said second data set being arranged so that each of said swaths having at least two areas containing print data and a void therebetween additionally contains area boundary information for each said area, but not any print data for said voids between areas;

said processing circuit being further configured to print a representation of said second data set by:

(f) temporarily storing in said memory circuit said second data set;

(g) inspecting said second data set to determine said swaths having at least two areas containing print data and a void therebetween;

(h) transmitting, swath by swath, to said print engine the print data and area boundary information for each said area, but not any print data for voids between areas; and said print engine including a printhead that, for each of said swaths, is configured by said processing circuit to:

(i) turn on at the beginning of the first of said areas included in the current swath and print slices according to the print data of said first area from said second data set;

(j) turn off at the end of said first area;

(k) move to each of the next of said areas included in the current swath, including the final of said areas included in the current swath;

(l) turn on at the beginning of said next area and print slices according to the print data of said next area from said second data set; and (m) turn off at the end of said next area;

thereby printing an entire page which has an identical appearance according to said first data set of bitmap print data.

15. The printer as recited in claim 14, wherein said print engine includes a printer carriage/printhead assembly, and wherein said printer carriage/printhead assembly moves at a first velocity when passing over each of said areas, and moves at a second, greater velocity when passing over voids between areas.

16. The printer as recited in claim 15, wherein, to turn on said printhead, an application specific integrated circuit (ASIC) of said processing circuit includes logic that is configured to receive a print start position, read print data by direct memory access (DMA) from said memory circuit, and compare said print start position to the current printer carrier position, then cause said printhead to print according to said print data once the comparison becomes true; and when said printhead turns off, said ASIC logic is disabled.

17. The printer as recited in claim 14, wherein said second data set comprises a plurality of swaths, and at least one of said swaths comprises a plurality of areas and at least one void therebetween; and wherein each of said plurality of areas includes at least one of:

(i) bitmap print data containing at least one non-blank slice having pels that are to be represented by printed dots on print media, (ii) bitmap print data containing a number of consecutive blank slices that is less than said threshold, and is therefore not a void, and (iii) padding.

18. A method for compacting print job data, said method comprising:

(a) providing a host computer having an HC processing circuit, an HC memory circuit, and an HC communications port, wherein said host computer compacts a first data set of bitmap print data stored in said HC memory circuit by:

(i) dividing said first data set into a plurality of swaths each containing a plurality of slices, (ii) inspecting each of said plurality of swaths to determine whether or not there exists a number of consecutive blank slices at least as large as a predetermined threshold value, wherein a blank slice contains no pels that are to be printed, and if so, (iii) dividing the current swath into a plurality of areas each containing at least one pel to be printed, wherein each said area is separated from other said areas by a void of initially unknown size, each said void comprising consecutive blank slices at least as large as said threshold, and each said void having an actual size that is not constrained to any predetermined data size, (iv) creating area boundary information for each said area within said current swath, and (v) creating a second, uncompacted data set that contains print data associated with each said area of each said swath, said second data set being arranged so that each of said swaths having at least two areas containing print data and a void therebetween additionally contains area boundary information for each said area, but not any print data for said voids between areas, (b) sending said second data set to said HC communications port;

(c) providing a communications link that is operatively connected to said HC communications port and that receives data from said HC communications port; and (d) providing a printer having a PRT processing circuit, a PRT memory circuit, a PRT communications port, and a print engine, said PRT communications port being operatively connected to said communications link and receiving data from said communications link, wherein said printer prints a representation of said second data set by:

(i) temporarily storing in said PRT memory circuit said second data set,
(ii) inspecting said second data set to determine said swaths having at least two areas containing print data and a void therebetween,
(iii) transmitting, swath by swath, to said print engine the print data and area boundary information for each said area, but not any print data for voids between areas, and
(e) providing said print engine with a printhead that, for each of said swaths:
(i) turns on at the beginning of the first of said areas included in the current swath and print slices according to the print data of said first area from said second data set,
(ii) turns off at the end of said first area,
(iii) moves to each of the next of said areas included in the current swath, including the final of said areas included in the current swath,
(iv) turns on at the beginning of said next area and print slices according to the print data of said next area from said second data set, and
(v) turns off at the end of said next area;
thereby printing an entire page which has an identical appearance according to said first data set of bitmap print data.

19. The method as recited in claim 18, further comprising the step of performing a raster image processing operation to convert an initial data set of a high level language into a bitmap format, thereby creating said first data set.

20. The method as recited in claim 18, further comprising the steps of turning on a printhead by receiving a print start position, reading print data, and comparing said print start position to the current printer carrier position, thereby causing said printhead to print according to said print data once the comparison becomes true.

21. A method for compacting print job data, said method comprising the steps of:
(a) providing a computing/processing system comprising a processing circuit and a memory circuit, wherein said computing/processing system compacts a first data set of bitmap print data stored in said memory circuit by:
(b) dividing said first data set into a plurality of swaths each containing a plurality of slices;
(c) inspecting each of said plurality of swaths to determine whether or not there exists a number of consecutive blank slices at least as large as a predetermined threshold value, wherein a blank slice contains no pels that are to be printed, and if so;
(d) dividing the current swath into a plurality of areas each containing at least one pel to be printed, wherein each said area is separated from other said areas by a void of initially unknown size, each said void comprising consecutive blank slices at least as large as said threshold, and each said void having an actual size that is not constrained to any predetermined data size;
(e) creating area boundary information for each said area within said current swath; and
(f) creating a second, uncompacted data set that contains print data associated with each said area of each said swath, said second data set being arranged so that each of said swaths having at least two areas containing print data and a void therebetween additionally contains area boundary information for each said area, but not any print data for said voids between areas;

wherein said second data set, when printed by a printer, creates a document which has an identical appearance according to said first data set of bitmap print data.

22. The method as recited in claim 21, further comprising the step of performing a raster image processing operation to convert an initial data set of a high level language into a bitmap format, thereby creating said first data set.

23. A method for compacting print job data, said method comprising the steps of:
(a) providing a printer having a processing circuit and a memory circuit, wherein said printer compacts a first data set of bitmap print data stored in said memory circuit by:
(b) dividing said first data set into a plurality of swaths each containing a plurality of slices;
(c) inspecting each of said plurality of swaths to determine whether or not there exists a number of consecutive blank slices at least as large as a predetermined threshold value, wherein a blank slice contains no pels that are to be printed, and if so;
(d) dividing the current swath into a plurality of areas each containing at least one pel to be printed, wherein each said area is separated from other said areas by a void of initially unknown sizes each said void comprising consecutive blank slices at least as large as said threshold, and each said void having an actual size that is not constrained to any pre-determined data size;
(e) creating area boundary information for each said area within said current swath; and
(f) creating a second, uncompacted data set that contains print data associated with each said area of each said swath, said second data set being arranged so that each of said swaths having at least two areas containing print data and a void therebetween additionally contains area boundary information for each said area, but not any print data for said voids between areas;
(g) printing a representation of said second data set by:
(i) temporarily storing in said memory circuit said second data set;
(ii) inspecting said second data set to determine said swaths having at least two areas containing print data and a void therebetween;
(iii) transmitting, swath by swath, to a print engine the print data and area boundary information for each said area, but not any print data for voids between areas; and
(h) providing said print engine with a printhead that, for each of said swaths:
(i) turns on at the beginning of the first of said areas included in the current swath and print slices according to the print data of said first area from said second data set;
(ii) turns off at the end of said first area;
(iii) moves to each of the next of said areas included in the current swath, including the final of said areas included in the current swath;
(iv) turns on at the beginning of said next area and print slices according to the print data of said next area from said second data set; and
(v) turns off at the end of said next area;
thereby printing an entire page which has an identical appearance according to said first data set of bitmap print data.

24. The method as recited in claim 23, further comprising the step of performing a raster image processing operation to convert an initial data set of a high level language into a bitmap format, thereby creating said first data set.

25. The method as recited in claim 23, further comprising the steps of turning on a printhead by receiving a print start position, reading print data, and comparing said print start position to the current printer carrier position, thereby causing said printhead to print according to said print data once the comparison becomes true.

* * * * *